(12) United States Patent
Kotov et al.

(10) Patent No.: US 11,385,911 B2
(45) Date of Patent: Jul. 12, 2022

(54) INTEGRATION OF FRAGMENT MODULES IN USER INTERFACES

(71) Applicant: PAYPAL, INC., San Jose, CA (US)

(72) Inventors: Arseniy Kotov, Santa Clara, CA (US); Suket Ramkishan Somani, San Jose, CA (US); Ankur Tiwari, San Jose, CA (US); Titus Woo, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/122,391

(22) Filed: Dec. 15, 2020

(65) Prior Publication Data
US 2022/0188129 A1 Jun. 16, 2022

(51) Int. Cl.
  *G06F 3/048* (2013.01)
  *G06F 9/451* (2018.01)
  *G06F 3/0482* (2013.01)

(52) U.S. Cl.
  CPC .......... *G06F 9/451* (2018.02); *G06F 3/0482* (2013.01); *G06F 2203/04803* (2013.01)

(58) Field of Classification Search
  CPC .................. G06F 9/451; G06F 3/0482; G06F 2203/04808
  See application file for complete search history.

(56) References Cited

U.S. PATENT DOCUMENTS

| | | | | |
|---|---|---|---|---|
| 2009/0303676 A1* | 12/2009 | Behar | ............... | G06F 16/9577 361/679.27 |
| 2013/0238723 A1* | 9/2013 | Balannik | ............... | G06Q 10/10 709/206 |
| 2016/0104159 A1* | 4/2016 | Butterfield | ........... | G06Q 20/384 705/44 |
| 2017/0132685 A1* | 5/2017 | Hou | .................... | G06F 16/9535 |
| 2019/0332433 A1* | 10/2019 | Nadimpalli | ............... | G06F 9/50 |
| 2020/0192683 A1* | 6/2020 | Lin | ........................ | G06F 9/445 |

OTHER PUBLICATIONS

Micro Frontend Architecture and Best Practices, dated Aug. 24, 2020, https://www.xenonsiack.com/insights/what-is-micro-frontend/, 12 pages.

* cited by examiner

*Primary Examiner* — Claudia Dragoescu
(74) *Attorney, Agent, or Firm* — Haynes and Boone, LLP

(57) ABSTRACT

Methods and systems are presented for providing a framework to integrate independent fragment modules into an integrated user interface. The fragment modules can be simultaneously rendered on a user interface page or sequentially rendered across multiple user interface pages. The fragment modules are configured to interact with a user via the user interface. The interactions with the user may trigger an event. When an event associated with a fragment module occurs, the fragment module is configured to broadcast the event. An orchestrator is configured to monitor events associated with different fragment modules. The orchestrator may include an event handler for performing one or more action in response to an event. The action may include configuring another fragment module to modify a presentation and/or perform a transaction based on the event.

20 Claims, 15 Drawing Sheets

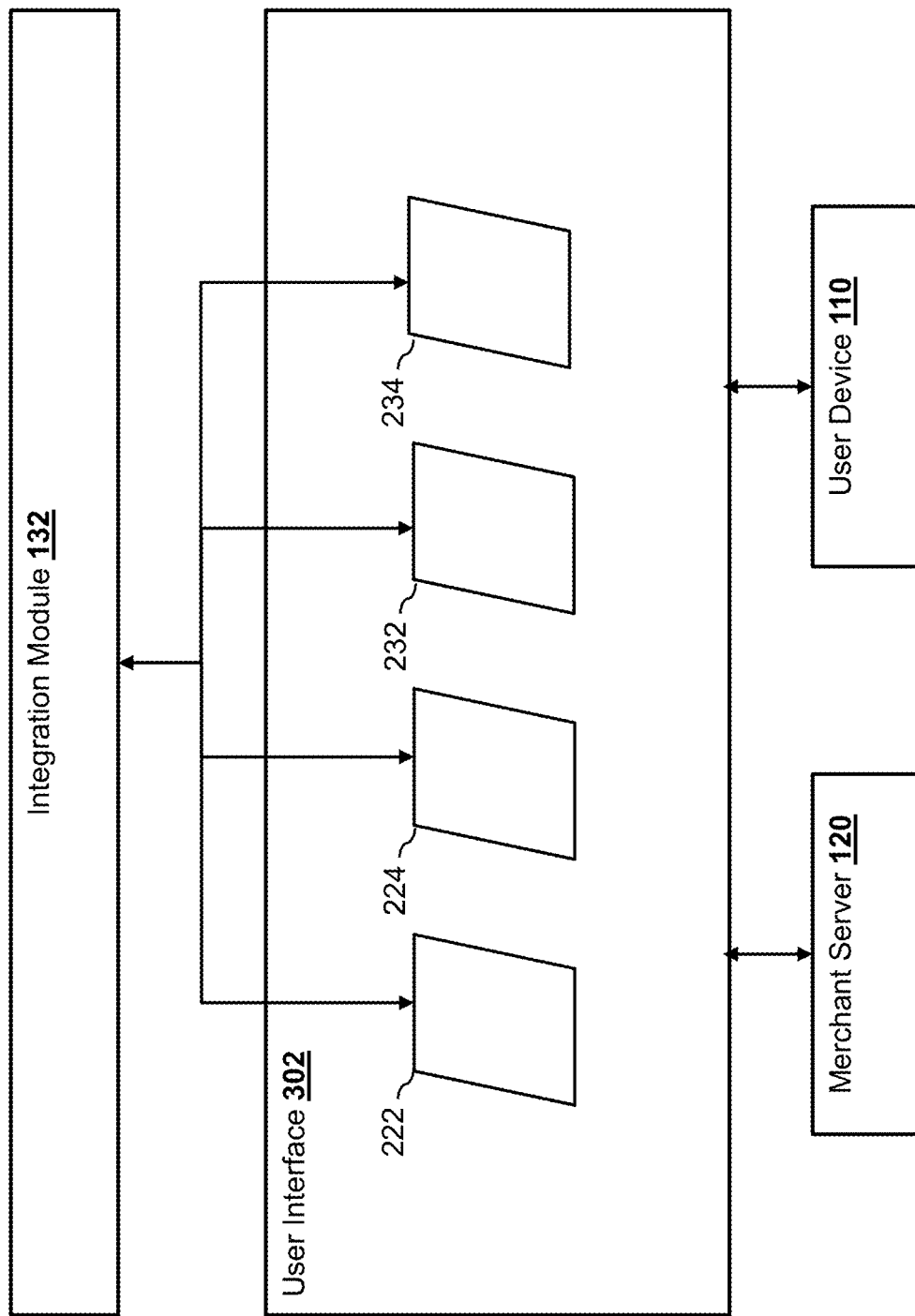

INTEGRATION OF FRAGMENT MODULES IN USER INTERFACES

BACKGROUND

The present specification generally relates to electronic user interfaces, and more specifically, integrating fragment modules into an electronic user interface according to various embodiments of the disclosure.

RELATED ART

Electronic user interfaces (e.g., webpages, mobile applications, etc.) that are provided by online service providers are becoming increasingly sophisticated. When the number of services offered by an online service provider is increasing and the services provided by the online service provider are becoming more extensive, the online service provider may divide the user interface into different portions, where each portion may be developed and managed by different teams of employees. Each portion of the user interface may correspond to a particular service (or a part of the particular service) offered by the online service provider. In some instances, different teams may be responsible for developing and managing different user interface pages. For example, one team may be responsible for managing a homepage of the user interface. Another team may be responsible for managing pages of the user interface associated with performing a first service offered by the online service provider. Yet another team may be responsible for managing pages of the user interface associated with performing a second service offered by the online service provider.

In some other instances, even a single user interface page (e.g., a single webpage such as a homepage, a transaction page, etc.) may be divided into multiple portions (e.g., a header portion, a footer portion, a menu bar portion, an account summary portion, a notification portion, a main body portion, etc.). Different teams of employees may be responsible for different software modules that correspond to the different portions on the user interface page. In yet other instances, a service offered by the online service provider may include multiple sub-flows, where different teams may be responsible for managing user interface pages associated with the different sub-flows.

While having different teams to develop and manage different portions of the electronic user interface allows individual modules associated with different services to be developed more efficiently, it can also create obstacles for integrating these modules to work together. Thus, there is a need for developing a framework that allows software modules to be seamlessly integrated into a user interface.

BRIEF DESCRIPTION OF THE FIGURES

FIG. 3 illustrates integrating multiple fragment modules into a user interface according to an embodiment of the present disclosure;

Figure 1:
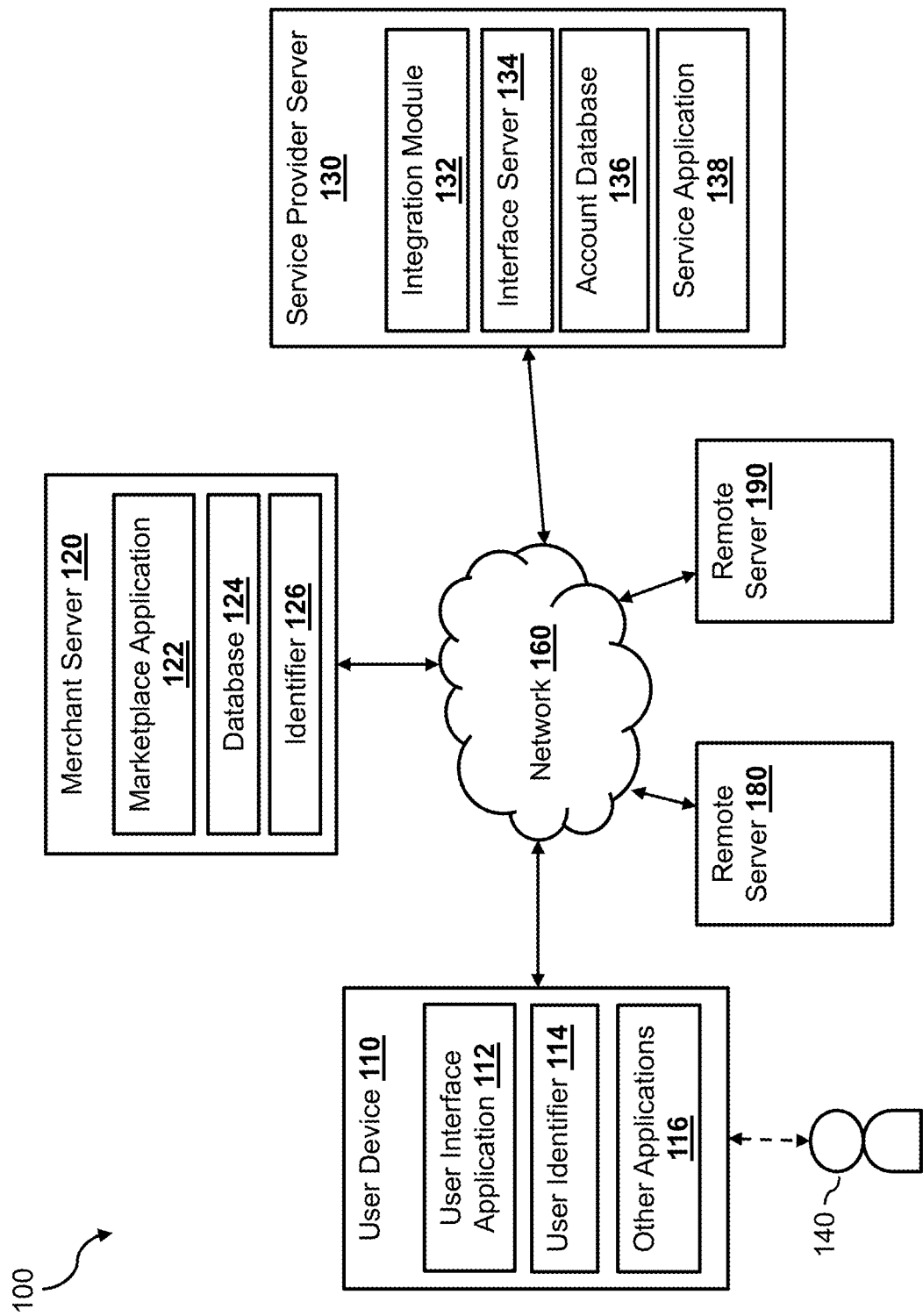
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a framework (also referred to as a fragment module integration framework) for integrating fragment modules to generate an integrated user interface. As discussed above, modern electronic user interfaces of online service providers can be sophisticated and are often composed of a number of modules for performing different functions of the online service providers via the user interfaces. In some embodiments, each module (which may be a software application) may be developed and managed independently (e.g., by a separate team of software developers) as a standalone application such that the module remains modular and can be reused in different user interface pages (e.g., different webpages, different mobile application pages, etc.) or in different workflow sequences. Each module may correspond to performing a particular function or set of functions for the online service provider via the user interface (e.g., displaying an account balance, displaying a menu bar, receiving user input and retrieve data from a data store based on the user input, etc.). The modules that are developed in this manner may work well individually, providing their respective services to users via the user interface. However, it poses challenges to the online service provider when a service offered by the online service provider requires integration of different modules, as the modules may not be configured to work and/or communicate easily with each other.

In some embodiments, at least some of the modules may be developed in concert with each other (e.g., with efforts by the different teams to coordinate with each other). Those modules that are developed in concert with each other may be more easily integrated with each other in the user interface. However, developing modules in such a concerted effort is inefficient, as it requires substantial amount of additional time and effort to coordinate and debug. Furthermore, while those modules that have been developed in such a manner may be integrated well with each other, they are still not sufficiently flexible because the modules may not integrate well with other modules that were not developed together.

As such, according to various embodiments of the disclosure, the framework may enable various independently developed and managed fragment modules to be integrated within a user interface of an online service provider. The user interface provided by the online service provider may include one or more user interface pages (e.g., a service provider website including different webpages, etc.). In some embodiments, each fragment module may be developed independently as a standalone application for performing a function, a service, or part of a service offered by the online service provider. Each fragment module may be developed to include a set of user interface elements (e.g., text, input elements such as input box, radial button, image capturing module, voice capturing module, etc.), a processing component for performing one or more backend functions (e.g., performing a database query, transmitting data via a network to a remote device, etc.), and a set of presentation elements.

For example, a fragment module associated with a menu bar of the user interface may be developed to include a set of selectable elements (e.g., buttons, etc.) corresponding to a set of fixed menu items, such as 'home,' 'activity,' 'pay & get paid,' 'marketing for growth,' 'financing,' and 'app center.' Each of the selectable elements may include a link to a particular user interface page of the online service provider. For example, the selectable elements corresponding to the 'home' menu item may include a link associated with a homepage of the online service provider. Selecting that selectable element will cause the user interface to redirect the user to the homepage of the online service provider. The selectable elements corresponding to the 'activity' menu item may include a link associated with an activity page of the online service provider, which presents recent online activities of the user. Selecting that selectable element will cause the user interface to redirect the user to the activity page of the online service provider. The selectable elements corresponding to the other menu items may perform similar functions for redirecting the user to the corresponding user interface page of the online service provider.

A recent transaction fragment module associated with a recent transaction portion of the user interface may be configured to access transaction data associated with a user account and present at least a portion of the transaction data on the user interface. In some embodiments, the recent transaction fragment module may also include selectable elements for presenting additional details of one or more of the transaction being presented. For example, a user may select a selectable element corresponding to a particular transaction being displayed on the user interface. In response to detecting the selection of the selectable element, the recent transaction fragment module may retrieve additional data associated with the particular transaction and may present the additional data on the user interface.

A transaction refund fragment module associated with a transaction portion of the user interface may be configured to receive, via the user interface, a transaction identifier associated with a particular transaction performed with the user account and may perform a refund for the transaction based on the transaction identifier.

In some embodiments, each fragment module within the framework is required to define a set of input parameters, state data that indicates a state, and a set of events. The set of input parameters may be used by a fragment module to customize the fragment module as it is rendered on the user interface. For example, one or more of the input parameters may be used by the fragment module to modify an appearance (e.g., a color scheme, a font scheme, a title, a size, etc.) of the fragment module as it is rendered on a user interface page. As the fragment module can be integrated (along with other fragment modules) within different user interface pages, it is important that the appearance of the fragment module is consistent with the overall look and feel of the user interface of the online service provider, and the context of the remaining portions on a user interface page in which it is rendered.

The state data indicates a state of the fragment module being rendered on a user interface page. Some of the fragment modules that provide dynamic content may be rendered differently based on the state of the fragment module within a transaction workflow. For example, when a fragment module is first executed (instantiated) on the user interface, the fragment module may be configured to operate in an initial state. Based on interactions with users and/or other factors such as timing, the fragment module may change the state of a transaction workflow performed by the fragment module. The rendering of the fragment module may then be changed based on the change of the state.

In some embodiments, each fragment module may also define a set of events that may occur after the fragment module is rendered on a user interface page. An event can be triggered based on different factors such as an interaction of a user with the fragment module (e.g., selecting a button appearing on the rendering of the fragment module on the user interface, cursor hovering a particular area on the rendering of the fragment module on the user interface, etc.), a timing (e.g., a period of inactivity), a receipt of data from a remote device or module, etc. The fragment module may determine how each of the defined events should be handled, which may include changing a state of the fragment module within a transaction workflow. Furthermore, the occurrence an event can be broadcast to the user interface in which the fragment module is rendered and to other fragments rendered on the user interface, such that another module may perform one or more actions based on the event (e.g., by using an event handler).

In some embodiments, the framework may provide an orchestrator module for facilitating the rendering of the different fragment modules within a user interface page. The orchestrator module may be part of the computer software associated with the user interface of the online service provider. In some embodiments, when the online service provider (e.g., a web server associated with the online service provider) receives a request for accessing a user interface page, the orchestrator module may determine content for the user interface page and a set of fragment modules that are associated with the user interface page. The orchestrator module may then render the content along with the set of fragment modules on the user interface page for the user. For example, when the user is accessing a homepage of the online service provider, the orchestrator module may retrieve content associated with the homepage of the online service provider (e.g., a logo associated with the online service provider, etc.) and a set of fragment modules that is associated with the homepage, which may include a header fragment module for presenting a header of the homepage, a menu bar fragment module for presenting a menu bar of the homepage, an account summary fragment module for presenting summarized data associated with a user account, and a recent transaction fragment module for presenting data associated with a list of recent transactions conducted through the user account. The orchestrator module may determine a layout for the content and the set of fragment modules for the homepage (e.g., locations and sizes for the content and the set of fragment modules, etc.), and may render the content and the set of fragment modules according to the layout.

In some embodiments, the orchestrator module may execute (e.g., instantiate, render, etc.) the set of fragment modules on the user interface page with corresponding input parameters. For example, the input parameters provided to the set of fragment modules may indicate one or more appearance settings, such as a color scheme, a font scheme, a location and/or size of the corresponding fragment module within the user interface page, an identifier associated with the user interface page, a displayed title for the fragment module, a display preference, etc. The orchestrator module may also execute (instantiate or render) the set of fragment modules with an initial state.

In some embodiments, the orchestrator module may include a set of event handlers for handling different events that occur for the set of fragment modules. As discussed herein, each fragment module may define a set of events that can occur after the fragment module is rendered on a user interface page. An event may be triggered based on factors such as a user interaction with the fragment module (e.g., a selection of a button, a cursor hovering over an area of the fragment module, etc.), a timing (e.g., the fragment module has been rendered for a certain period of time, etc.), etc. When an event associated with a fragment module is triggered, the fragment module may perform an action (e.g., changing a state of the fragment module, changing content being displayed on the fragment module, etc.). The fragment module may also broadcast such an event to the orchestrator module and/or other fragment modules of the user interface page. As such, the orchestrator module may define a set of actions to perform based on one or more of the events of the set of fragment modules by way of defining different event handlers for handling different events. The action(s) that the orchestrator perform may involve relaying the event to other fragment modules rendered on the user interface, modifying the content displayed on the user interface page, redirecting the user to another user interface page, and/or modifying other fragment modules.

Thus, after rendering the content and the set of fragment modules on the user interface page, the orchestrator module may monitor events associated with the set of fragment modules. When the orchestration module detects an event from a particular fragment module, the orchestration module may trigger the event handler associated with the event and perform actions according to the event handler. As discussed herein, the actions may include modifying the content being presented on the user interface page, redirecting the user to another user interface page, and/or modifying one or more other fragment modules rendered on the user interface page.

Using the framework described herein, different independently developed fragment modules that are standalone applications may easily be integrated together to provide a coherent and integrated user interface. For example, the orchestration module of the user interface may configure each of the fragment modules (e.g., based on the input parameters) to have a coherent look and feel of the desired user interface page (e.g., displaying respective content in a manner according to an appearance theme of the user interface page). In addition, the orchestration module may also monitor events that occur in each of the fragment modules and may modify the content of the user interface and/or other fragment modules rendered on the user interface accordingly. Thus, the framework advantageously enables both easy implementations of fragment modules and flexibility of integrating different fragment modules to work together to present a coherent and integrated user interface.

Different use cases may be derived based on this framework. For example, a quick link fragment module can be developed based on the framework disclosed herein according to various embodiments of the disclosure. In some embodiments, the quick link fragment module can dynamically modify a set of links presented on the user interface based on one or more factors, such as user preferences, the user interface page on which the quick link fragment module is rendered, and events associated with other fragment modules rendered on the user interface page. Similar to other fragment modules, the quick link fragment module is a standalone application that can be rendered and executed on any user interface page independent of other fragment modules.

The quick link fragment module may be configured to present links associated with user interface pages for performing various functions and/or services for users. As discussed herein, an online service provider may offer a variety of services via its electronic user interface. For example, an online payment service provider may provide services to a merchant such as an account summary service for presenting a summary of a user account, a transaction listing service for listing a set of transactions conducted through the user account, an invoicing service for generating invoices based on different transactions conducted through the user account, a refund service for issuing refunds for paid transactions conducted through the user account, a send money service for sending funds from the user account to another user account, and a variety of other payment-related services. In order to provide quality user experience via the electronic user interface, services that are frequently used by a user (e.g., a merchant, etc.) should be easily accessible via the user interface.

Thus, the quick link fragment module may be configured to present links (e.g., HTML links, etc.) associated with user interface pages that perform the services that are frequently used by the user. In some embodiments, the quick link fragment module may dynamically present different links on a user interface based on usage frequency. The online service provider may track usage patterns of a user account and may rank the services based on how frequent the services are used through the user account. The quick link fragment module may then be configured to present a set of links corresponding to services that are most frequently accessed by the user in each user interface page.

In some embodiments, the usage frequency of different services may be different based on which user interface page the user is accessing. Thus, the quick link fragment module may be configured to present different links corresponding to different services based on the user interface page on which the quick link fragment module is rendered. In some embodiments, in addition to the account identifier, the orchestration module may provide a page identifier identifying the user interface page to the quick link fragment module as an input parameter when executing and/or rendering the quick link fragment module. The quick link fragment module may determine a set of services that have been frequently accessed through the user account from the user interface page and may present links to the set of services accordingly.

In some embodiments, the quick link fragment module may enable a user to provide input regarding which links to be presented. For example, the quick link fragment module may present a 'link edit' selectable element that allows the user to edit the links presented in the quick link module. In another example, the quick link fragment module may receive the user preference information based on the user's interactions with other fragment modules rendered on the user interface page.

Another use case that may be derived based on the framework as disclosed herein is the development of quick action fragment modules. Similar to the quick link fragment module, the quick action fragment modules enable the user to quickly access services that are frequently used by a user. Unlike the quick link fragment module, each quick action fragment module corresponds to a particular service offered by the online service provider. In some embodiments, each quick action fragment module is a standalone application that is configured to perform the service (e.g., a transaction) for the user. For example, an account summary fragment module may be configured to present a summary of the user account on the user interface. A recent transaction fragment module may be configured to display transaction data associated with recent transactions conducted through the user account. A send money fragment module may be configured to perform a fund transfer transaction through the user account. An invoicing fragment module may be configured to generate an invoice for a transaction conducted through the user account.

Since the quick action fragment modules are standalone applications that are not dependent on any other modules or devices, the orchestration module may execute and render any one or more quick action fragment modules in any one of the user interface pages of the online service provider and integrate the quick action fragment modules with any other modules. For example, the orchestration module may include, on the homepage of the online service provider, the quick link fragment module and one or more quick action fragment modules corresponding to services that are frequently used by the user. In some embodiments, based on the usage frequency of the user, the orchestration module may dynamically select different quick action fragment modules to be included in user interface pages for different user accounts. Furthermore, since a user may have different usage patterns on different user interface pages, the orchestration module may also dynamically include different quick action fragment modules in different user interface pages for the user account.

In some embodiments, the orchestration module may modify one or more of the quick action fragment modules rendered on a user interface page and/or change (e.g., add and/or remove) the fragment modules being included on the user interface page based on events detected for another quick action fragment module. For example, the orchestration module may include a recent transaction fragment module configured to present transaction information of recent transactions on a user interface page (e.g., a homepage). A selection (e.g., by the user) of a particular transaction on the recent transaction fragment module may trigger an event (e.g., a transaction selection event). The orchestration module may detect such a transaction selection event occurred in the recent transaction fragment module using the techniques disclosed herein. The orchestration module may determine that the user frequently uses the invoicing service of the online service provider to generate an invoice after viewing information of a transaction. Thus, upon detecting the transaction selection event, the orchestration module may determine whether the invoicing fragment module is included in the user interface page. If the invoice fragment module is not included in the user interface page, the orchestration module may add the invoicing fragment module to the user interface page (or replace another fragment module in the user interface page with the invoicing fragment module).

Furthermore, the invoicing fragment module may modify the content being presented on the user interface page based on the transaction selection event. For example, under a default operation (e.g., without receiving the identifier of the particular transaction), the invoicing fragment module may present input elements on the user interface page that enable a user to input a transaction identifier, and a submission button. Upon receiving a selection of the submission button, the invoicing fragment module may generate an invoice for a transaction based on the transaction identifier received via the input elements. In response to receiving the input parameter that indicates that transaction identifier of the particular transaction, the invoicing fragment module may automatically fill-in the input elements with the transaction identifier. In some embodiments, the invoicing fragment module may automatically generate an invoice for the particular transaction and present the invoice on the user interface.

Yet another use case that may be derived based on the framework as disclosed herein is the development of setup card fragment modules. The setup card fragment modules may be configured to track progresses of setting up various services offered by the online service provider for the users. The online service provider may provide different types of services to its users. In the example where the online service provider is an electronic payment service provider, the services may include integrating an online checkout service within a website of the user (e.g., a merchant website), integrating an invoicing API with the merchant website, etc. Some of these services offered by the online service provider require multiple steps, and some of the steps require actions performed by different parties, such as the user, the online service provider, a credit bureau, another institution, etc. When a user (e.g., a merchant) initiates a setup process for setting up a service with the online service provider via the electronic user interface, the orchestration module may execute a setup fragment module corresponding to setting up the service for the user. The setup fragment module may be configured to prompt the user for the necessary information for setting up the service. The setup fragment module may also be configured to perform other backend processing, such as communicating with other parties (e.g., the credit bureau, etc.) to obtain additional information for setting up the service, communicating with the user's website for integrating programming code associated with the service into the user's website, etc. The setup fragment module may update a status of the setup process and may store the status in a data store associated with the user account of the user.

However, after initiating the setting up of the service, it can be difficult for the user to track the progress of the setup process for setting up the service, what the next step is in the setup process, or whether the user's action is required to move the process forward, especially when the setup process requires multiple steps performed by different parties. Thus, a setup card fragment module (separate and independent from the corresponding setup fragment module) may be configured to correspond with each service that requires a multi-step setup process of the online service provider.

In some embodiments, the setup card fragment module may determine whether a user is in the process of setting up any services of the online service provider by accessing a database associated with the user. Based on the information in the database, the setup card fragment module may present the up-to-date status of the set of process(es) of one or more services being set up for the user. This way, the user can view the progresses of all the setup processes that have been indicated and not completed easily on the user interface page the user is viewing.

In some embodiments, the setup card fragment module may also display an alert when the setup process is awaiting an action from the user (e.g., submission of documents, confirmation, etc.) to remind the user to perform the action in order to move forward the setup process. In some embodiments, a selection of the alert (e.g., by the user) may trigger an alert selection event for the setup card fragment module. Based on the alert selection event, the setup card fragment may change from presenting of the progress of the setup process to presenting a description of the steps/actions required for the user to take. The setup card fragment module may also broadcast the alert selection event. Upon detecting the alert broadcast event, the orchestration module may perform one or more actions by way of executing an event handler associated with the alert selection event. For example, in response to detecting the alert broadcast event, the orchestration module may determine whether the setup fragment module corresponding to setting up the service is included in the user interface page accessed by the user. If the setup fragment module is not included, the orchestration module may add the setup fragment module to the user interface page (or replace another fragment module in the user interface page with the setup fragment module), such that the user can perform the action on the same user interface page without being redirected to another user interface page.

The examples described above, including the quick link fragment modules, the quick action fragment modules, and the setup card fragment modules, illustrate the integrations of fragment modules that are rendered simultaneously (e.g., concurrently) on a user interface page. According to another aspect of the disclosure, multiple fragment modules can be integrated in a sequential manner for facilitating a workflow associated with performing a service of the online service provider. In some embodiments, each of the fragment modules may be associated with performing a part of the service. For example, the online service provider may provide an onboarding service to potential users, for registering new users with the online service provider. The process for performing the onboarding service may involve several sub-processes, including, for example, a sub-process to select a country of origin (or a language), a sub-process to present and receive acceptance for one or more terms of services, a sub-process to receive information associated with the user (e.g., a name, an address, funding account data, etc.), and possibly other sub-processes.

Since the processes of many services offered by the online service provider require one or more of the same sub-processes, having different fragment modules for performing different sub-processes enables the online service provider to re-use these fragment modules in different processes, which increase the efficiency of developing and managing the software modules associated with the user interface of the online service provider. When the orchestrator module receives a request, from a user, to perform a service, the orchestrator module may determine a sequence of sub-processes required to perform the service. In the example of performing an onboarding service, the orchestrator module may determine a sequence of sub-processes, including the sub-process for selecting a country of origin, a sub-process for confirming terms of services, a sub-process for obtaining an address, and possibly other sub-processes. The orchestrator module may then retrieve the fragment modules corresponding to these sub-processes, such as the country selector fragment module, the TOS fragment module, the address collector fragment module, and other fragment modules.

The orchestrator may then sequentially execute and render the fragment modules according to the sequence of sub-processes associated with performing the service. By sequentially executing the fragment modules, the orchestrator module presents, on a display of a user device, a sequence of user interface pages corresponding to the fragment modules one after another to perform the service (e.g., the onboarding service).

In some embodiments, during the execution of the sequence of fragment modules, the orchestrator module may monitor events that occur in the fragment modules and may perform one or more actions based on detecting the events. The actions may include modifying a state and/or an input parameter for one or more other fragment modules, suspending and/or aborting the execution of a fragment module, resuming the execution of a fragment module with state information, aborting the performance of the service, or other actions.

For example, when a user selects a value from a first fragment module, the orchestrator module may render subsequent modules based on the selected value, which may indicate an appearance option, a language option, a workflow option, etc. However, when a subsequent fragment module (e.g., a second fragment module) detects an inconsistency with the selected value, an event may be trigger which may cause the orchestrator module to suspend execution of the second fragment module, re-execute the first fragment module to confirm the selected value with the user before resuming the execution of the second fragment module.

In some embodiments, one or more fragment modules may be executed within another fragment module (e.g., nested fragment modules). In these scenarios, the fragment module that executes one or more other fragment modules may take the role as the orchestrator for controlling and render the one or more other fragment modules executed therein. For example, the terms of services may be different for different services, even though the terms for each service may be a compilation of various standard term templates, that may be used for other services. As such, multiple term fragment modules may be developed and configured to present and confirm acceptance of the various standard term templates. When the orchestrator module executes the TOS fragment module, the TOS fragment module may select and retrieve a set of term fragment modules for the service. The TOS fragment module may also execute the term fragment modules sequentially to obtain confirmation of acceptance from the user for each of the corresponding terms. The TOS fragment module may modify the different term fragment modules based on events occurred in any one or more of the term fragment modules executed within the TOS fragment module in a similar manner described herein. For example, whenever the user accepts a term (e.g., select the accept button), the TOS fragment module may execute the next term fragment module, and if all of the term fragment modules have been executed, the TOS fragment module may trigger a completion event, which may be detected by the orchestrator module.

On the other hand, if the user declines a term (e.g., select the decline button), the TOS fragment module may trigger an error event and broadcast the error event, which may be detected by the orchestrator module. The TOS fragment module may prompt the user, via the user interface, for a confirmation that the user is declining that term and may provide a warning that declining the term will abort the performance of the service. When the orchestrator detects the error event from the TOS fragment module, the orchestrator module may abort the performance of the service, may present an alert to the user indicating that the service cannot be performed, or any other action.

Thus, by using the framework as illustrated above, fragment modules that are independent from other fragment modules can be seamlessly integrated to generate a coherent and integrated user interface based on a facilitator, such as the orchestrator module. The fragment modules are modular and can be integrated with different fragment modules to generate different integrated user interfaces for the online service provider. The use of the orchestrator module enables the fragment modules, once integrated within a user interface, to provide integrated services which involve actions from two or more fragment modules in a coordinated manner.

FIG. 1 illustrates an electronic transaction system 100, within which the fragment module integration framework may be implemented according to one embodiment of the disclosure. Note that the present techniques may be applied in many different computing and technological environments, however, and are not limited to those shown in the figures. The electronic transaction system 100 includes a service provider server 130, a merchant server 120, remote servers 180 and 190, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120, the remote servers 180 and 190, and/or the service provider server 130 over the network 160. For example, the user 140 may use the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130, or with one of the remote servers 180 and 190. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120, the remote servers 180 and 190, and/or the service provider server 130 over the network 160. In one implementation, the user interface application 112 includes a software program (e.g., a mobile application) that provides a graphical user interface (GUI) for the user 140 to interface and communicate with the service provider server 130, the remote servers 180 and 190, and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110. For example, the user 140 may use the input component to interact with the digital wallet application 112 (e.g., to add a new funding account, to provide information associated with the new funding account, to initiate an electronic payment transaction, etc.).

While only one user device 110 is shown in FIG. 1, it has been contemplated that multiple user devices, each associated with a different user, may be connected to the merchant server 120, the service provider server 130, and the remote servers 180 and 190 via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. As shown, the merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110, the service provider server 130, and the remote servers 180 and 190 via the network 160.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130. In some embodiments, the fragment module integration framework may be implemented within or in association with the interface server 134.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes an integration module 132 that implements the fragment module integration framework as discussed herein. The integration module 132 may be configured to integrate fragment modules into a coherent and integrated user interface provided by the interface server 134. In some embodiments, the fragment modules that the integration module 132 use to generate a user interface for the service provider server 130 may be stored in the service provider server 130 (e.g., in a data storage within the service provider server 130). In some embodiments, at least some of the fragment modules may be stored in the remote servers 180 and 190. Each of the remote servers 180 and 190 may be similar to the service provider server 130 and may be associated with an online service provider (e.g., another electronic payment service provider, an online bank, etc.). As the fragment modules are modular and can be developed independent from other modules, the integration module 132 may use fragment modules that are developed by different teams or even different organizations. As such, the integration module 132 may advantageously integrate fragment modules associated with different organizations to be included within a single user interface for the service provider server 130. Similarly, each of the remote servers 180 and 190 may include a respective integration module configured to integrate fragment modules to generate a respective user interface. In some embodiments, each of the remote servers 180 and 190 may retrieve and integrate fragment modules associated with the service provider server 130 for generating its respective user interface.

Figure 2:
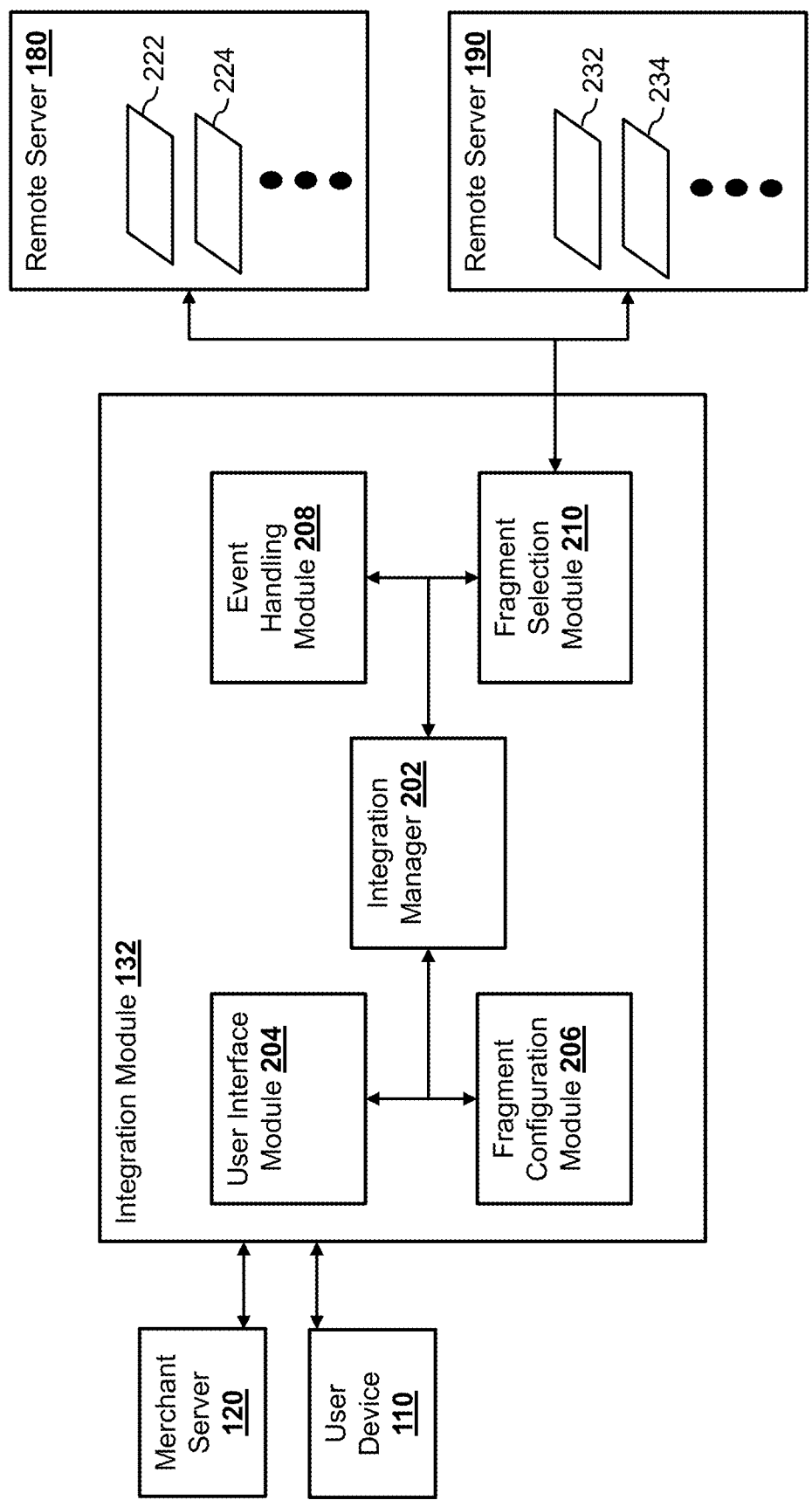
FIG. 2 is a block diagram illustrating a integration module according to an embodiment of the present disclosure.

FIG. 2 illustrates a block diagram of the integration module 132 according to an embodiment of the disclosure. The integration module 132 includes an integration manager 202, a user interface module 204, a fragment configuration module 206, an event handling module 208, and a fragment selection module 210. In some embodiments, the integration module 132 may have access to fragment modules, such as fragment modules 222, 224, 232, 234, etc. for integration into various user interfaces. As discussed herein, each fragment module may be developed independently as a stand-alone application for performing a function, a service, or part of a service. Each fragment module may developed to include a set of user interface elements (e.g., text, input elements such as input box, radial button, image capturing module, voice capturing module, etc.), a processing component for performing one or more backend functions (e.g., performing a database query, transmitting data via a network to a remote device, etc.), and a set of presentation elements. For example, a menu bar fragment module may be configured to display a set of menu items for redirecting the user to different webpages of a website. A recent transaction fragment module may be configured to retrieve transaction data associated with transactions recently conducted through a user account and present the transaction data on a user interface. The presentation may also be interactive, such that the user may select individual transactions from the presentation, and the recent transaction fragment module may then present detail information related to the selected transaction(s). For ease of development and management of these fragment modules, different fragment modules may be developed and/or managed by different groups of people (e.g., different teams within an organization, different organizations, etc.).

As such, the integration module 132 may access fragment modules that are developed by various entities (e.g., different teams of software developers within the same organization such as PayPal®, different organizations, etc.). In some embodiments, the integration module 132 may access fragment modules that are stored in different devices, such as the service provider server 130 and external servers such as remote servers 180 and 190, for integrating within various user interfaces.

In some embodiments, each fragment module is required to define a set of input parameters, state data that indicates a state, and a set of events. The set of input parameters may be used by a fragment module to customize the fragment module as it is rendered on the user interface. For example, one or more of the input parameters may be used by the fragment module to modify an appearance (e.g., a color scheme, a font scheme, a title, a size, etc.) of the fragment module as it is rendered on a user interface page. As the fragment module can be integrated (along with other fragment modules) within different user interface pages, it is important that the appearance of the fragment module is consistent with the overall look and feel of the user interface of the service provider server 130, and the context of the remaining portions on a user interface page in which it is rendered.

The state data indicates a state of the fragment module being rendered on a user interface page. Some of the fragment modules that provide dynamic content may be rendered differently based on the state of the fragment module within a transaction workflow. For example, when a fragment module is initially executed and rendered (e.g., instantiated), the fragment module may be operating in an initial state. Based on interactions with users and/or other factors such as timing, the fragment module may change the state (e.g., from the initial state to another operating state) within a transaction workflow. In some embodiments, the state may be changed according to a workflow corresponding to performing a service of the online service provider. Thus, the change of state may indicate a progress in the workflow. The rendering of the fragment module may change as well based on the change of the state. For example, based on an initial state, the recent transaction fragment module may be rendered to display a list of recent transactions conducted through a user account. However, the recent transaction fragment module may also be configured to display details of a particular transaction (e.g., upon receiving a selection of the particular transaction) when the state is changed from the initiate state to a transaction detail state. Thus, the state of the fragment module indicates how the fragment module should be rendered on the user interface page.

Each fragment module may also define a set of events that may occur after the fragment module is rendered on a user interface page. An event can be triggered based on an interaction of a user with the fragment module (e.g., selecting a button appearing on the rendering of the fragment module on the user interface, cursor hovering a particular area on the rendering of the fragment module on the user interface, etc.). An event can also be triggered based on factors that are not related to user's interactions, such as a timing (e.g., inactivity after a threshold period of time, etc.), a receipt of data from a remote device or module, etc. The fragment module may determine how each of the defined events should be handled. In some embodiments, an event may change a state of the fragment module. For example, upon receiving a selection of a particular transaction, the recent transaction fragment module may change the state of the fragment module from the initial state to the transaction detail state. Thus, based on the change of the state, the recent transaction fragment module may change the rendering from displaying a list of recent transactions to displaying detail information of the one particular transaction. Furthermore, the occurrence of an event can be broadcasted to the user interface (e.g., the integration module 132) in which the fragment module is rendered and to other fragments rendered on the user interface, such that the event handing module 208 and the fragment configuration module 206 may perform one or more actions (e.g., modifying the content on the user interface, causing another fragment module to change a state or appearance, etc.).

In some embodiments, the integration module 132 may be communicatively coupled to merchant servers (e.g., the merchant server 120) and user devices (e.g., the user device 110), for example, via the interface server 134. In some embodiments, the integration module 132 is configured to generate integrated user interfaces by integrating one or more fragment modules and provide the integrated user interfaces to users. When the interface server 134 receives a request to access a user interface (e.g., an HTTP request to access a webpage of the service provider server 130), the interface server 134 of some embodiments may transmit the request to the integration module 132. The fragment selection module 210 may determine, based on the user interface in the request (e.g., a homepage, a transaction detail webpage, etc.), a set of fragment modules for integration into the requested user interface. The set of fragment modules may include some or all of the fragment modules accessible by the integration module 132. In some embodiments, the set of fragment modules may include fragment modules stored in different devices and/or servers.

As shown in FIG. 3, the fragment selection module 210 may select a set of fragment modules 222, 224, 232, and 234 for a requested user interface 302. The integration manager 202 may retrieve the fragment modules 222, 224, 232, and 234 from the remote servers 180 and 190, respectively. The fragment configuration module 206 may configure the fragment modules based on the requested user interface. For example, the fragment configuration module 206 may provide each of the fragment modules a set of input parameters. The set of input parameters may specify one or more aspects of the appearance of the fragment modules when they are rendered on the user interface (e.g., font size attributes, font color attributes, spacing attributes, background attributes, a size of the rendering, a location of the fragment module within the user interface, etc.) such that the look and feel of the fragment modules 222, 224, 232, and 234 are consistent with each other and with the user interface on which they are rendered.

The user interface module 204 may integrate the fragment modules 222, 224, 232, and 234 into an integrated user interface by disposing the fragment modules 222, 224, 232, and 234 into different areas (or different sequence) of the user interface according to a layout and specification for the user interface. In some embodiments, the integrated user interface may include a single user interface page (e.g., a webpage), on which multiple fragment modules may be concurrently rendered. In some embodiments, the integrated user interface may include a sequence of user interface pages, as part of a workflow. Each fragment module may be rendered as a single user interface page or a series of user interface pages in the sequence of user interface pages for performing the workflow. In some embodiments, multiple fragment modules may be rendered in at least one user interface page in the sequence of user interface pages. The integrated manager 202 may then provide the integrated user interface on the requested device (e.g., the user device 110, the merchant server 120, etc.).

After providing the integrated user interface on the requested device, the event handling module 208 may monitor events that are broadcasted by one or more of the fragment modules. As discussed herein, an event may be triggered by a user interaction with one or more of the rendered fragment modules or other factors, such as timing. In some embodiments, when the event handling module 208 detects an event associated with a fragment module, the event handling module 208 and/or the fragment configuration module 206 may perform one or more actions, such as modifying the user interface, providing an input parameter to another fragment module rendered on the user interface, etc. As such, the integration module 132 may orchestrate the behavior and/or changes of the different fragment modules rendered on the user interface, based on detected events associated with the fragment modules.

Figure 4A:
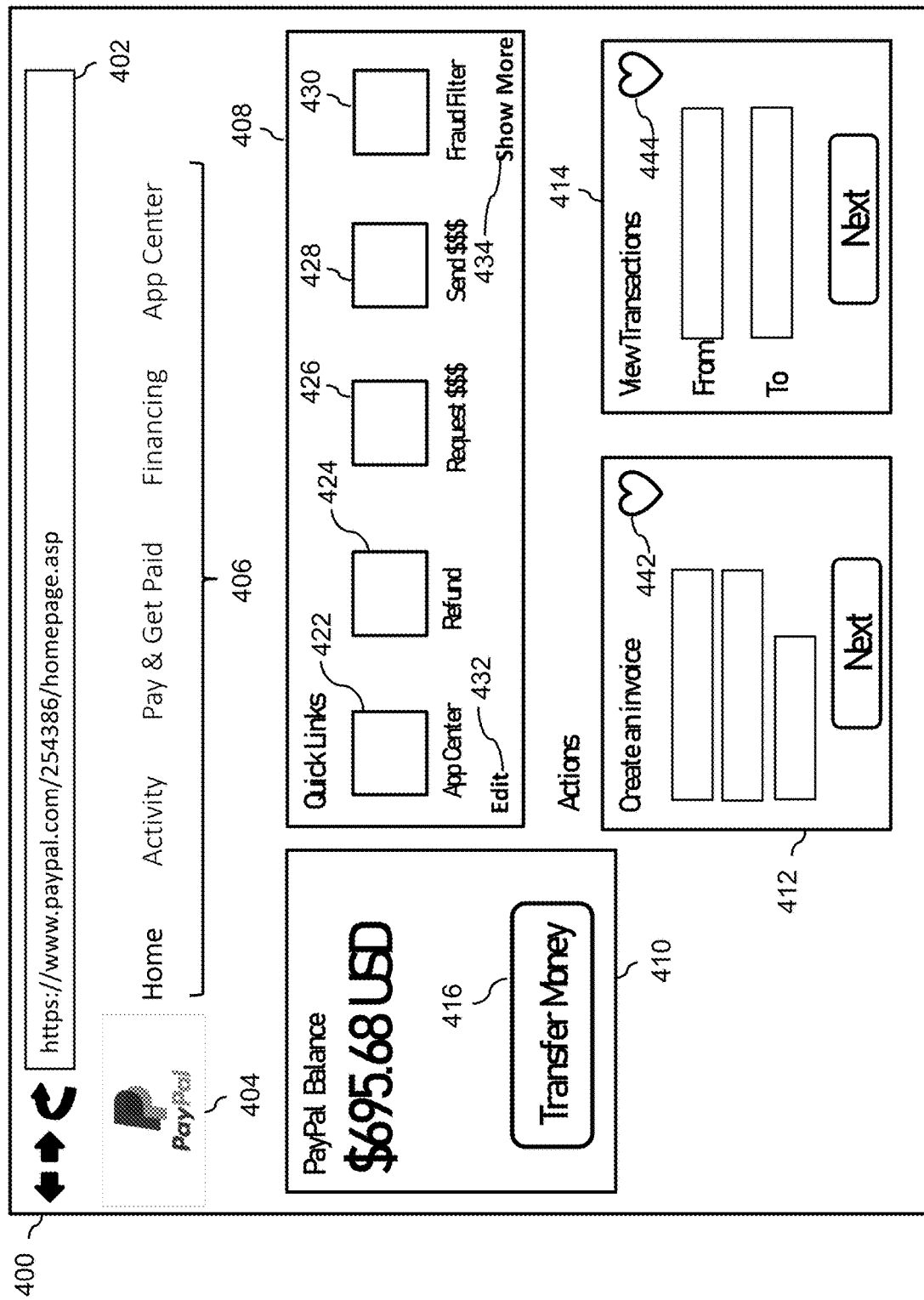
FIG. 4A illustrates a user interface page that includes a quick link fragment module integrated with other fragment modules according to an embodiment of the present disclosure.

FIG. 4A illustrates an example user interface 400 generated by integrating multiple fragment modules according to various embodiments of the disclosure. In this example, the user interface 400 corresponds to a homepage of the website of the service provider server 130. For example, the user 140, via the user device, may submit an HTTP request for the homepage of the website using the uniform resource locator (URL) address 402 associated with the homepage. The interface server 134 (which may include a web server) may receive the HTTP request, and may transmit the HTTP request or a user interface request to the integration module 132. Based on the request, the integration manager 202 may determine content for the user interface, and may use the fragment selection module 210 to select a set of fragment modules for the user interface. For example, the integration manager 202 may determine content for the user interface 400, such as a logo 404.

In some embodiments, the fragment selection module 210 may select fragment modules for the user interface 400 based on different criteria. For example, the fragment selection module 210 may determine a set of default (e.g., fixed) fragment modules based on an identity of the user interface. Since the user interface 400 is a homepage of the website, the fragment selection module 210 may determine a menu bar fragment module 406 and a quick link fragment module 408, since these two modules are rendered in all webpages of the website. The fragment selection module 210 may also determine an account summary fragment module 410 based on the user interface 400 corresponding to the homepage of the website. In some embodiments, the fragment selection module 210 may also determine fragment modules to be rendered on a user interface based on a usage pattern of a user. For example, the fragment selection module 210 may determine that the user 140 has logged into a user account with the service provider server 130. Based on past usage pattern of the user 140 on the website, the fragment selection module 210 may rank the services that are frequently used by the user 140, and may determine one or more fragment modules corresponding to the most frequently used services by the user 140. In this example, the fragment selection module 210 may determine that the user 140 uses the invoicing service and the view transaction service most frequently. Thus, the fragment selection module 210 may determine quick action fragment modules corresponding to the invoicing service and the view transaction service, such as an invoicing fragment module 412 and a recent transaction fragment module 414 for the user interface 400.

The fragment configuration module 206 of some embodiments may configure the selected fragment modules 406-414 for rendering on the user interface 400. In some embodiments, the fragment configuration module 206 may configure the fragment modules 406-414 by providing one or more input parameters to each of the fragment modules 406-414. The input parameters may indicate an identity of the user interface 400 on which they are to be rendered (e.g., the homepage of the website, etc.), an account identifier of the user account, and other input values that may specify various aspects of the appearance of the fragment modules, such as a font type, a font size, a font color, a background color, a size, a title, a location of the fragment modules, etc., such that the fragment modules 406-414 are rendered with a look and feel that is consistent with each other and with the look and feel of the homepage of the website.

The user interface module 204 may then render the user interface 400 by rendering the determined content (e.g., the logo 404) and by executing and/or rendering the fragment modules 406-414 at their respective locations within the user interface 400. For example, the user interface module 204 may render the menu bar fragment module 406 on the top of the user interface 400 next to the logo 404. The user interface module 204 may render the account summary fragment module 410 on the left side of the user interface 400. The user interface module 204 may render the quick link fragment module 408 on the right top side of the user interface 400 and may render the various quick action fragment modules, such as the invoicing fragment module 412 and the recent transaction fragment module 414 below the quick link fragment module 408.

As shown, the menu bar fragment module 406, upon rendering, displays a set of menu items that enable the user to access different categories of services associated with the service provider server 130. In this example, the menu bar fragment module 406 displays a home menu that enables the user to access the homepage, an activity menu that enables the user access various activities with the service provider server 130, the pay & get paid menu that enables the user to pay to another user account and request payment from another user account, a financing menu that enables the user to access various financing services associated with the service provider server 130, and an app center menu that enables the user to access various applications associated with the service provider server 130. Since the menu bar fragment module 406 is independent from other modules and/or content in the user interface 400, the menu bar fragment module 406 can be reused in other user interface pages (e.g., other webpages, other mobile application pages, etc.) or even other user interface (e.g., a user interface associated with another online service provider, etc.). For example, the menu bar may be a standard feature of the website of the service provider server 130. As such, the integration module 132 may integrate the menu bar fragment module 406 into all user interfaces (e.g., all webpages, all mobile application, etc.) such that the user may access/browse any of these categories of services while viewing any of the user interfaces associated with the service provider server 130. By developing the menu bar as a fragment module (e.g., a standalone application), the menu bar can be easily re-used and integrated into different user interfaces without re-developing the menu bar in every user interface. In some embodiments, the menu bar fragment module 406 is configured to present the same set of menus for every user account and on every user interface on which it is rendered.

The account summary fragment module 410 is configured to access account information of a user account and present a summary of the account information on the user interface. Thus, when executing the account summary fragment module 410, the user interface module 204 may provide an account identifier of a user account (e.g., the user account that the user 140 has logged into via the user device 110) as one of the input parameters. Based on the account identifier, the account summary fragment module 410 may retrieve account data from the account database 136, and may present the account data on the user interface 400. In this example, the account summary fragment module 410 presents an account balance of the user account. In addition, the account summary fragment module 410 also presents a selectable element 416 for enabling the user 140 to transfer money to another user account. As discussed herein, when the account summary fragment module 410 was initially executed, the account summary fragment module may be operating in an initial state. When the user 140 selects the transfer money selectable element 416, the account summary fragment module 410 may change from the initial state to a money transfer state. Based on the money transfer state, the account summary fragment module 410 may present different content on the user interface 400 (e.g., a text input box for entering an account identifier, another text input box for entering an amount to transfer, etc.).

The quick link fragment module 408 may be configured to present, on the user interface 400, a set of links associated with various user interface pages and/or services for the user. In this example, as rendered on the user interface 400, the quick link fragment module 408 presents an 'app center' link 422 associated with an application center service, a 'refund' link 424 associated with a refund service, a 'request $$$' link 426 associated with a payment request service, a 'send $$$' link 428 associated with a transfer fund service, and a 'fraud filter' link 430 associated with a fraud filtering service. In some embodiments, the links presented in the quick link fragment module 408 may overlap with the menu presented in the menu bar fragment module 406. However, unlike the menu bar fragment module 406, the quick link fragment module 408 of some embodiments may be configured to dynamically present different sets of links for different user accounts and/or dynamically present different sets of links on different user interface pages.

In some embodiments, the quick link fragment module 408 may dynamically present different sets of links on different user interface pages and/or for different user accounts based on one or more factors, such as user preferences, usages patterns of the user account, the user interface page on which the quick link fragment module is rendered, and events associated with other fragment modules rendered on the user interface page.

In some embodiments, the quick link fragment module 408 may be configured to present links (e.g., HTML links, etc.) associated with user interface pages that perform the services that are frequently used by the user. In some embodiments, the service provider server 130 and/or the integration module 132 may include the quick link fragment module 408 in multiple different user interface pages (e.g., different webpages, different mobile application pages, etc.) such that a user may access the services easily regardless of which user interface page the user is accessing. Thus, the integration module 132 may be configured to include the quick link fragment module when a user is accessing these user interface pages. Since the quick link fragment module 408 is a standalone application, the quick link fragment module can be executed and rendered within any user interface pages consistently as the quick link fragment module is not dependent on any other modules.

In some embodiments, the quick link fragment module 408 may dynamically present different links on a user interface based on usage frequency. The interface server 134 may track usage patterns of user accounts and may rank the services based on how frequent the services are used through each of the user accounts. For example, the interface server 134 may rank a first service (e.g., an invoicing service) higher than a second service (e.g., a send money service) when the first service has been used through the user account more frequently than the second service. The interface server 134 may store the ranking of services in association with the user account, for example, in the account database 136. When a user interface page (e.g., the user interface page 400) that includes the quick link fragment module is accessed by the user 140, the integration manager 202 may determine whether the user 140 is logged into a user account (e.g., via authenticating the user for accessing the user account through a login process, etc.). If it is determined that the user 140 has logged into a user account, the fragment configuration module 206 may provide an account identifier associated with the user account to the quick link fragment module 408 as an input parameter when executing the quick link fragment module 408. In some embodiments, the quick link fragment module 408 may retrieve the services ranking information based on the account identifier, and may determine a set of links for presenting on the user interface page based on the services ranking information (e.g., selecting the top 5 services, etc.).

In some embodiments, the quick link fragment module 408 may enable a user to provide input regarding which links to be presented. Different embodiments may use different techniques to receive user preference information from the user. For example, the quick link fragment module 408 of some embodiments may present an 'edit' selectable element 432 that enables a user to edit the links presented by the quick link fragment module 408. When the user 140 selects the 'edit' selectable element 432, the quick link fragment module 408 may present a set of interfaces that enable the user 140 to remove and/or add links to the list of links presented on the user interface. In some embodiments, the quick link fragment module 408 may also include a 'show more' selectable element 434 that enables the user 140 to view additional links.

In another example, the quick link fragment module may receive user preference information based on the user's interaction with other fragment modules rendered on the user interface page. In some embodiments, each fragment module related to performing a service of the online service provider (e.g., each quick action fragment module) may be configured to present a 'favorite' selectable element indicating that the service is a favorite of the user. As shown in FIG. 4A, each of the quick action fragment modules (e.g., the invoicing fragment module 412 and the recent transaction fragment module 414) includes a 'favorite' selectable element (e.g., the selectable element 442 and the selectable element 444). In this example, the 'favorite' selectable elements 442 and 444 are in a heart shape, although the 'favorite' selectable element of other embodiments may be in different forms and shapes. The user 140 may indicate that a service corresponding to a quick action fragment module is a favorite by selecting the corresponding 'favorite' selectable element. For example, the user 140 in this instance may select the 'favorite' selectable element 442 to indicate that the invoicing service is one of the favorite services for the user 140.

The selection of the 'favorite' selectable element 442 may trigger an event (e.g., favorite selection event) associated with the invoicing fragment module 412. In some embodiments, the invoicing fragment module 412 may perform one or more actions based on the favorite selection event. For example, the invoicing fragment module 412 may highlight the 'favorite' selectable element 442 to indicate that the user 140 has selected the invoicing fragment module 412 as one of the favorites. The invoicing fragment module 412 may also broadcast the favorite selection event to the integration module 132 and/or other fragment modules rendered on the user interface 400. Upon detecting the favorite selection event, the event handling module 208 may perform one or more actions. For example, the event handling module 208 may cause another fragment module rendered on the user interface 400 (e.g., the quick link fragment module 408) to change. The event handling module 208 may provide the quick link fragment module 408 an indication that the user 140 has selected the invoicing service as one of the favorite services based on the favorite selection event associated with the invoicing fragment module 412 (e.g., as an input parameter via an API of the quick link fragment module 408). Based on the input parameter, the quick link fragment module 408 may add a link corresponding to the invoicing service for presenting on the user interface 400.

Figure 4B:
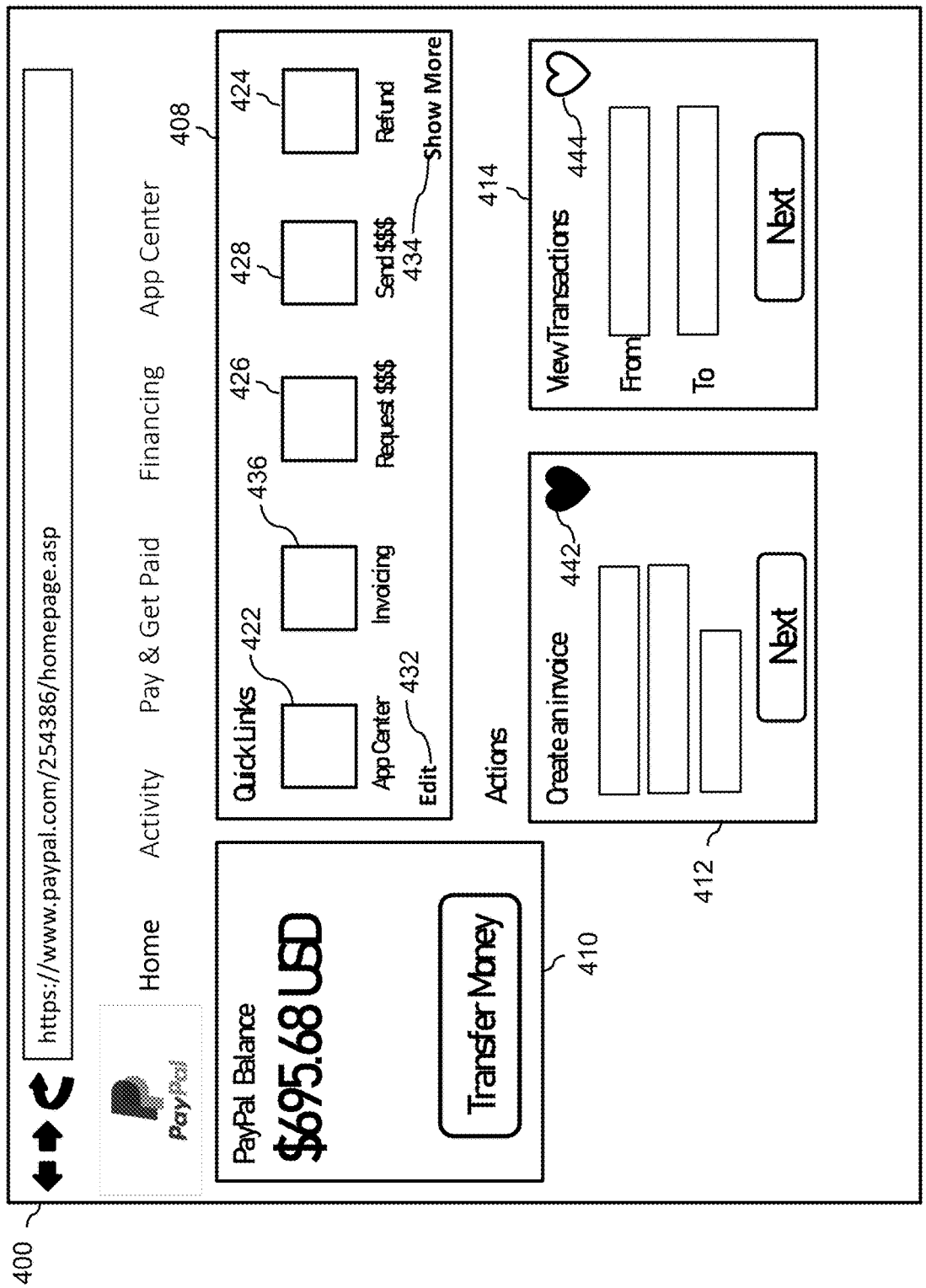
FIG. 4B illustrates a modification to the quick link fragment module based on a detected event associated with another fragment module according to an embodiment of the present disclosure.

FIG. 4B illustrates the user interface 400 after the user 140 has selected the 'favorite' selectable element 442 of the invoicing fragment module 412. As shown, the invoicing fragment module 412 has highlighted the 'favorite' selectable element 442 (e.g., by changing from an outline of a heart to a solid heart) to indicate that the user 140 has selected the invoicing service as one of the favorite services. The quick link fragment module 408 has also modified the set of links presented on the user interface 400 based on the favorite selection event (provided by the integration module 132). In this example, the quick link fragment module 408 has added an invoicing link 436 associated with the invoicing service and removing the fraud filter link 430 (due to limited presentable space associated with the quick link fragment module 408 on the user interface 400). In some embodiments, the change of the links may persist across other user interfaces and/or user interface pages. For example, even when the user 140 accesses other user interface pages (e.g., a transaction detail pages, the quick link fragment module 408 may present the modified set of links (that includes the invoicing link 436) on the other user interface pages.

In some embodiments, the quick link fragment module 408 may be configured to present different sets of links on different user interfaces and/or user interface pages. Since the usage frequency of different services may be different based on which user interface page the user is accessing, the interface server 134 may include different ranking of services based on different user interfaces and/or user interface pages accessed by a user. For example, the user may frequently access a page for presenting a list of recent transactions immediately after the user has logged into the user account (e.g., from the homepage of the online service provider), but the user may frequently access an invoicing function when the user is viewing detail information of a particular transaction. Thus, the quick link fragment module 408 may be configured to present different links corresponding to different services based on the user interface page on which the quick link fragment module is rendered. In some embodiments, in addition to the account identifier, the user interface module 204 may provide a page identifier identifying the user interface page to the quick link fragment module 408 as an input parameter when executing and/or rendering the quick link fragment module 408. The quick link fragment module 408 may determine a set of services that have been frequently accessed through the user account from the user interface page, and may present links to the set of services accordingly.

Figure 4C:
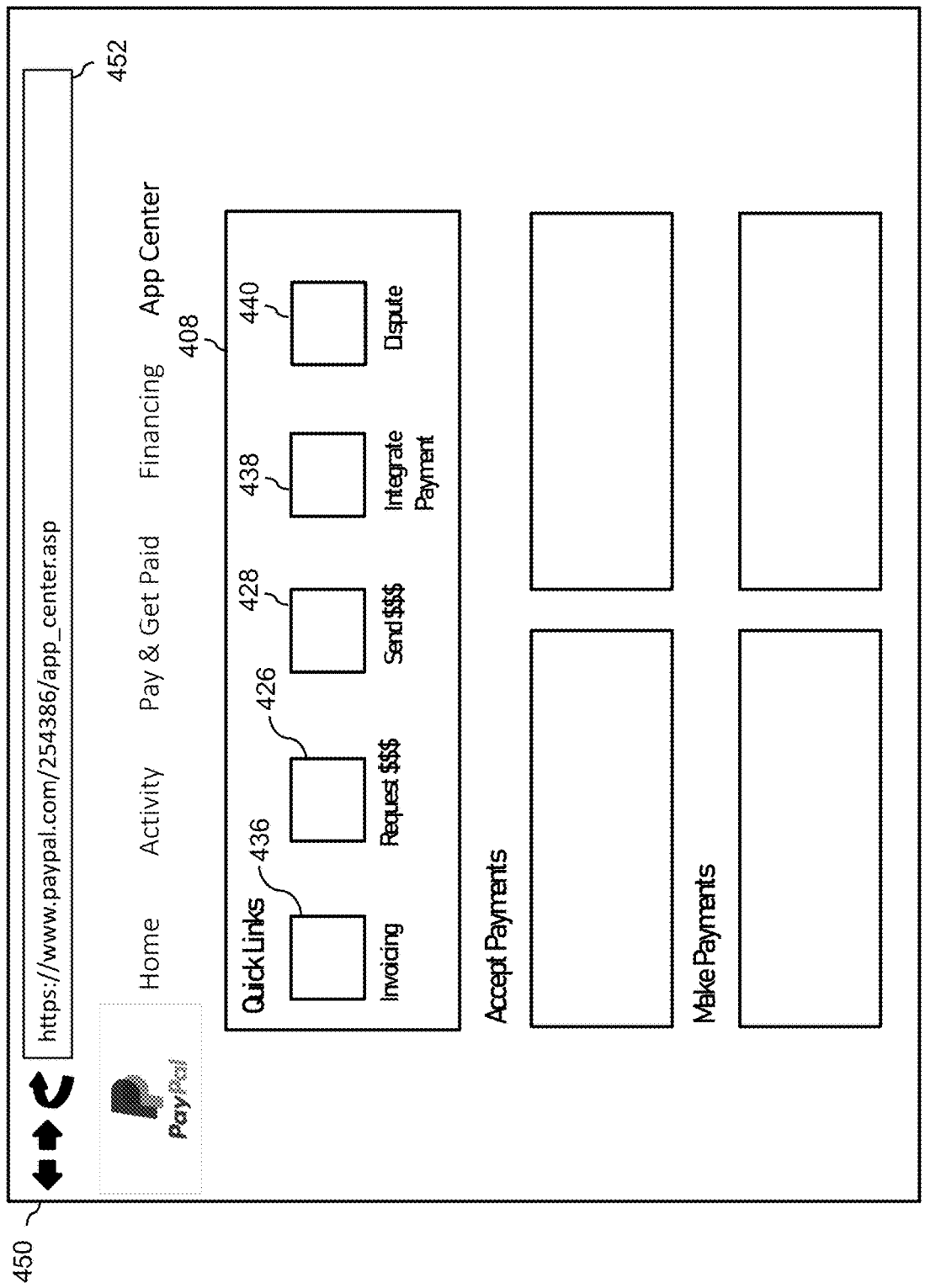
FIG. 4C illustrates the integration of the quick link fragment module across multiple user interface pages according to an embodiment of the present disclosure.

FIG. 4C illustrates another user interface page 450 accessed by the user 140 according to various embodiments of the disclosure. In this example, the user interface page 450 corresponds to a app center webpage of the website of the service provider server. When the integration module 132 generates the user interface 450 for the user 140, the user interface module 204 may provide to the quick link fragment module 408 as input parameters including an account identifier for the user account and a page identifier indicating the user interface 450 on which the quick link fragment module is rendered. Based on the account identifier and the page identifier, the quick link fragment module may determine a set of links corresponding to a set of services that is most frequently used by the user 140 on the user interface 450 based on the services ranking information retrieved from the account database 136. In this example, the quick link fragment module 408 determines a set of links including an 'invoicing' link 436, a 'request $$$' link 426, a 'send $$$' link 428, an 'integrate payment' link 438, and a 'dispute' link 440. As shown in this example, while some of the links may be shared with the ones presented by the quick link fragment module 408 for the user interface 400, the links do not necessarily be identical with the links presented on the user interface 400 since the usage patterns of the user 140 for the two user interfaces 400 and 450 may be different. Thus, the quick link fragment module 408 may dynamically present different links to different users and/or on different user interface pages.

Referring back to FIG. 4A, which also illustrates various quick action fragment modules, such as the invoicing fragment module 412 and the recent transaction fragment module 416, being integrated into the user interface 400. Similar to the quick link fragment module 408, the quick action fragment modules enable quick access of services that are frequently used by the user 140. Unlike the quick link fragment module 408, each quick action fragment module corresponds to a particular service offered by the service provider server 130. In some embodiments, each quick action fragment module is a standalone application that is configured to perform the service (e.g., a transaction) for the user. The quick action fragment module may perform a transaction associated with the service, all within the user interface without requiring the redirection of the user to another user interface or another user interface page. For example, the invoicing fragment module 412 may enable a user to create an invoice for a transaction while the user remains viewing of the user interface 400. As shown in FIG. 4A, the invoicing fragment module 412 presents one or more text input box for the user 140 to provide information such as a transaction identifier or other information that can identify one or more transactions. Once the invoicing fragment module 412 receives the information, the invoicing fragment module 412 may determine a particular transaction based on the information and may generate an invoice for the particular transaction. The invoicing fragment module 412 may present the generated invoice on the user interface 400.

Similarly, the recent transaction fragment module 414 may be configured to display transaction data associated with recent transactions conducted through the user account. As shown in FIG. 4A, the recent transaction fragment module 414 presents one or more text input boxes for the user 140 to enter information that identify a range of transactions. For example, the user 140 may provide a range of dates. The recent transaction fragment module 414 may then retrieve, from the account database 136, transaction data associated with transactions that have been conducted through the user account within the range of dates.

Since the quick action fragment modules are standalone applications that are not dependent on any other modules or devices, the integration module 132 may include (e.g., execute and render) any one or more quick action fragment modules in any one of the user interface pages of the online service provider and integrate the quick action fragment modules with any other modules. In this example, the integration module 132 has included, on the user interface 400 (e.g., the homepage of the website), quick action fragment modules such as the invoicing fragment module 412 and the recent transaction fragment module 414. However, the integration module 132 may include other quick action fragment module 412 in the user interface 400 (or other user interfaces).

In some embodiments, based on the usage frequency of the user, the fragment selection module 210 may dynamically select different quick action fragment modules to be included in user interface pages for different user accounts. Furthermore, since a user may have different usage patterns on different user interface pages, the fragment selection module 210 may also dynamically include different quick action fragment modules in different user interface pages for the user account.

Figure 4D:
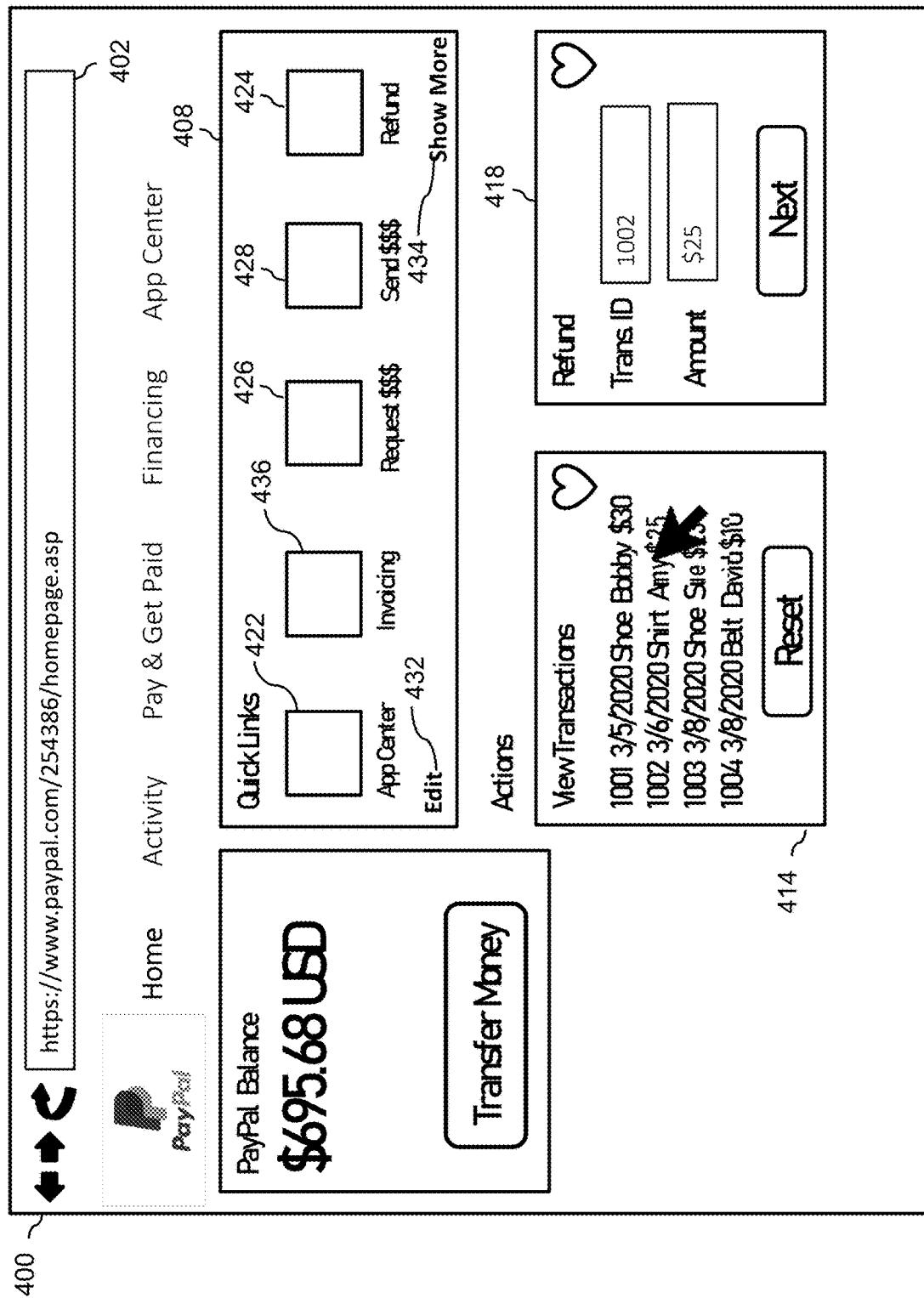
FIG. 4D illustrates a user interface page that includes multiple quick action fragment modules integrated with each other according to an embodiment of the present disclosure.

In some embodiments, the integration module 132 may modify one or more of the quick action fragment modules while they are rendered on a user interface page and/or change (e.g., add and/or remove) the fragment modules being included on the user interface page based on events detected for another quick action fragment module. FIG. 4D illustrates how the integration module 132 facilitates the dynamic changing of a quick action fragment module based on an event associated with another quick action fragment module. In FIG. 4D, the user 140 is viewing the user interface 400. In this example, the integration module 132 has integrated within the user interface 400 a set of quick action fragment modules including the recent transaction fragment module 414 and a refund fragment module 418. As discussed herein, the recent transaction fragment module 414 is configured to present information of transactions conducted through the user interface. The refund fragment module 418 is configured to perform a refund transaction for the user account.

Initially, when the fragment modules are executed and rendered on the user interface 400, the refund fragment module 418 may present one or more text input boxes that enable the user 140 to provide a transaction identifier that identifies a transaction and an amount to be refunded. The text input boxes may be empty at the initial state for the refund fragment module 418. When the recent transaction fragment module 414 receives input that can identify a set of transactions (e.g., a range of dates provided by the user 140), the recent transaction fragment module 414 may retrieve transaction data associated with the set of transactions from the account database 136, and may present at least a subset of the set of transactions on the user interface 400, as shown in FIG. 4D. In some embodiments, the user 140 may select one of the transactions being presented on the recent transaction fragment module 414 (e.g., clicking on the transaction, a cursor hovering over a transaction, etc.). For example, the user 140 may select the transaction with a transaction identifier '1002' by hovering a cursor on top of the transaction. The selection of a particular transaction (e.g., having the transaction identifier '1002') on the recent transaction fragment module 414 triggers an event (e.g., a transaction selection event) associated with the recent transaction fragment module 414. The recent transaction fragment module 414 may broadcast the transaction selection event to the integration module 132 and/or other fragment modules.

The event handling module 208 may determine that the user 140 likely initiates a refund transaction after viewing detail information about a particular transaction. Thus, upon detecting the transaction selection event, the event handling module 208 may determine whether the refund fragment module 418 has been rendered on the user interface 400. If the refund fragment module 418 is not include in the user interface 400, the integration manager 202 may add the refund fragment module 418 to the user interface 400 (or replace another inactive fragment module with the refund fragment module 418).

The event handling module 208 may also provide the transaction identifier '1002' as an input parameter to other fragment modules (e.g., the refund fragment module) via an API to communicate information of the transaction selection event to the other fragment modules. Upon receiving the transaction identifier '1002,' the refund fragment module 418 may change from the initial state to another state of the refund workflow. For example, instead of presenting the empty text input boxes on the user interface 400, the refund fragment module 418 may automatically fill-in data associated with the particular transaction in the text input boxes. As shown in FIG. 4D, the refund fragment module 418 has automatically filled in the transaction identifier '1002' in the text input box corresponding to the transaction identifier, and an amount associated with the transaction (e.g., $25) in the text input box corresponding to an amount. The user 140 may still be able to edit the data that was automatically filled into the text input box, but auto-filing the data save the user 140 time and effort when it is determined that the user 140 will likely perform the refund action after viewing details about a transaction. This way, the user 140 may request the refund fragment module to initiate the refund transaction for the particular transaction seamlessly after selecting the transaction on the recent transaction fragment module.

In some embodiments, if the integration manager 202 determines that the user 140 usually (e.g., exceeds a threshold percentage or number of times, etc.) requests to generate an invoice for a transaction after view details about a transaction (e.g., instead of issuing a refund), the integration manager 202 may instead pass the transaction identifier to the invoicing fragment module 412 instead of the refund fragment module 418. Based on the input parameter, the invoicing fragment module 412 may modify the content being presented on the user interface 400. For example, under a default operation (e.g., without receiving the identifier of the particular transaction), the invoicing fragment module 412 may present input elements on the user interface 400, such as text input box(ex) that enable a user to input a transaction identifier, and a submission button. Upon receiving a selection of the submission button, the invoicing fragment module 412 may generate an invoice for a transaction based on the transaction identifier received via the input elements. In response to receiving the input parameter that indicates that transaction identifier of the particular transaction, the invoicing fragment module 412 may automatically fill-in the input elements with the transaction identifier '1002.' In some embodiments, the invoicing fragment module 412 may automatically generate an invoice for the particular transaction and present the invoice on the user interface 400.

In addition to the quick link fragment module and quick action fragment modules, another type of fragment modules that can be developed and used by the integration module 132 is the setup card fragment module. In some embodiments, a setup card fragment module may be configured to track a progress of a setup process associated with a corresponding service. As discussed herein, some of the services provided by the service provider server 130 may require the user to go through respective setup processes for setting up the services. Examples of such services include integration of the online checkout service with a merchant website of a merchant user, integrating invoicing API with the merchant website, integrating a fraud filtering service with the merchant website, and other services. The setup process may involve prompting the user (e.g., merchant users, etc.) to perform actions (e.g., adding programming code to the merchant website), prompting the user to provide information, documents, and/or approval, involve third-parties (e.g., a credit bureau, a banking institute, etc.) to provide additional information, documents, and/or approval, and/or involve the online service provider of the service provider server 130 to review the information and provide confirmation and/or approval. As such, at least some of the setup processes for setting up various services may involve multiple steps and some of the steps may involve different parties. As a result, the setup process may not complete instantaneously, and may take some time (e.g., several hours, several days, etc.) to complete.

In some embodiments, setup fragment modules may be developed to facilitate the setup process of the various services provided by the service provider server 130. Different setup fragment modules may be developed and configured for facilitating the setup process of different services. For example, an invoicing integration setup fragment module may be developed and configured to facilitate the setup process of integrating invoicing services with the merchant website, an online checkout setup fragment module may be developed and configured to facilitate the setup process of integrating online checkout services with the merchant website, and a fraud filtering setup fragment module may be developed and configured to facilitate integrating fraud filtering services with the merchant website.

Each setup fragment module may be configured to instruct the user to perform actions and prompt the user for the necessary information for setting up the corresponding service. The setup fragment module may also be configured to perform other backend processing, such as communicating with third parties (e.g., the credit bureau, etc.) to obtain additional information for setting up the service, communicating with the user's website for integrating programming code associated with the service into the user's website, linking the service with the user account, accessing the merchant's website to verify compliance of certain requirements or installation of certain programming code, etc. The setup fragment module may update a status of the setup process and may store the status in a data store associated with the user account of the user. However, after initiating the setting up of the service, it can be difficult for the user to track the progress of the setup process for setting up the service, what the next step is in the setup process, or whether the user's action is required to move the process forward, especially when the setup process requires multiple steps performed by different parties.

Thus, a setup card fragment module may be configured to track and present a progress of setting up a corresponding service offered by the online service provider for the users. Different setup card fragment modules may be developed for different services, and may be associated with different setup fragment modules. For example, an invoicing integration setup card fragment module may be developed and configured to track a setup progress of the integration of invoicing services into the merchant website, and associated with the invoicing integration setup fragment module. An online checkout setup card fragment module may be developed and configured to track a setup progress of the integration of online checkout services into the merchant website, and associated with the online checkout setup fragment module. A fraud filtering setup card fragment module may be developed and configured to track a setup process of the integration of fraud filtering services into the merchant website, and associated with the fraud filtering setup fragment module.

Figure 4E:
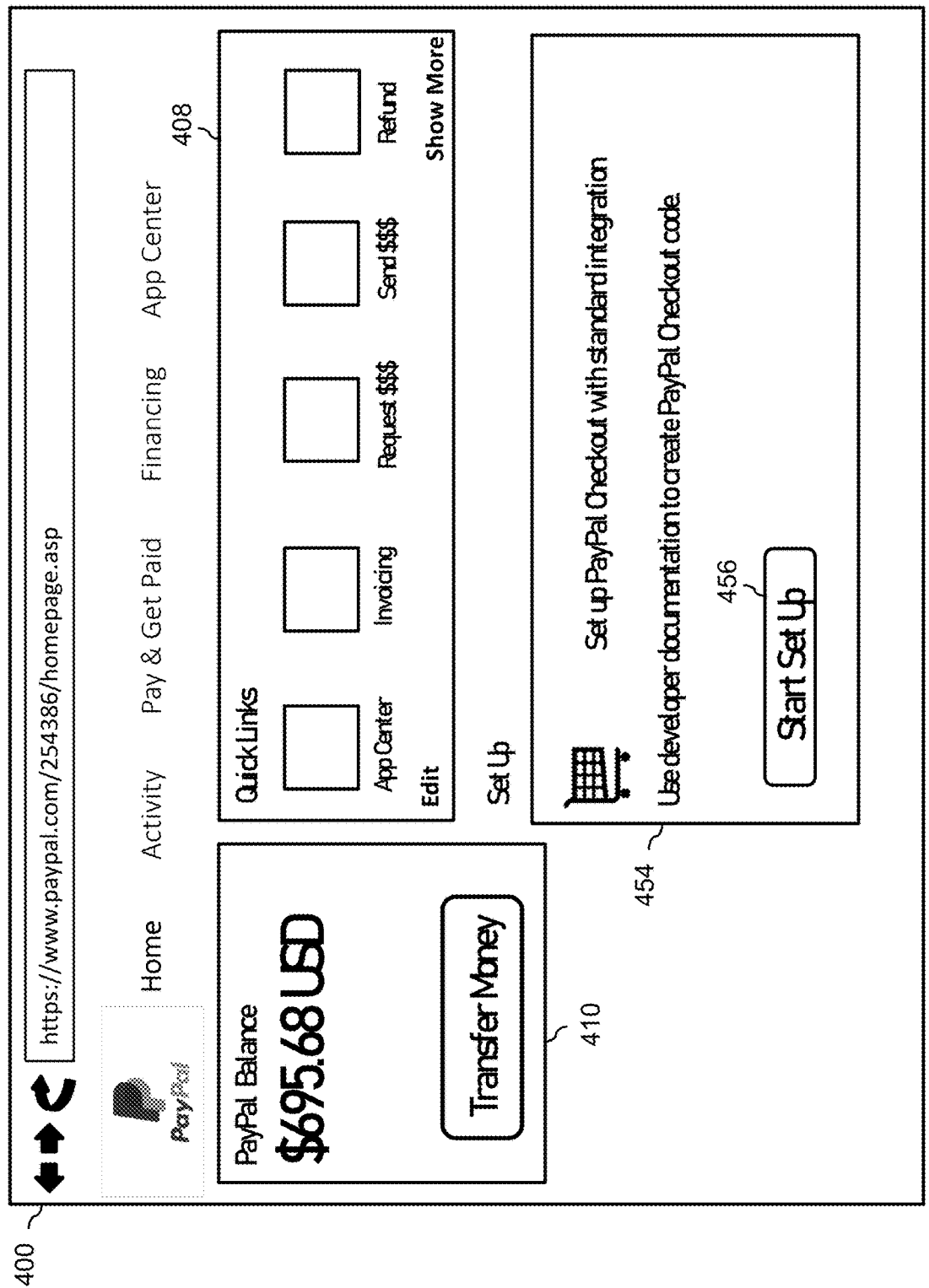
FIG. 4E illustrates a user interface page that includes a setup fragment module integrated with other fragment modules according to an embodiment of the present disclosure.

When a user (e.g., the user 140, a merchant user, etc.) initiates a setup process for setting up a service with the online service provider via the user interface of the service provider server 130, the integration module 132 may also execute/instantiate a corresponding setup card fragment module for tracking and presenting the progress of the setup progress. FIG. 4E illustrates the initiation of a setup process for integrating the online checkout process into a merchant website using the techniques disclosed herein according to various embodiments of the disclosure. As shown in FIG. 4E, the integration module 132 has included in the user interface 400 an online checkout setup fragment module 454, in addition to the account summary fragment module 410 and the quick link fragment module 408. In this example, a user may initiate the setup process for setting up the online checkout services into a merchant website via the online checkout setup fragment module 454 that is rendered on the user interface 400 (e.g., by selecting the "start set up" selectable element 456. In response to receiving a selection of the "start set up" selectable element 456, the online checkout setup fragment module 454 may initiate a setup process for integrating online checkout services in to a merchant website associated with the user. For example, the online checkout setup fragment module 454 may begin to prompt the user for additional information and facilitate installing programming code into the merchant website. In addition, the selection of the "start set up" selectable element 456 may also trigger an event (e.g., a start setup event) for the online checkout setup fragment module 454. Thus, the online checkout setup fragment module 454 may broadcast the start setup event to the integration module 132 and/or other fragment modules rendered on the user interface 400.

Figure 4F:
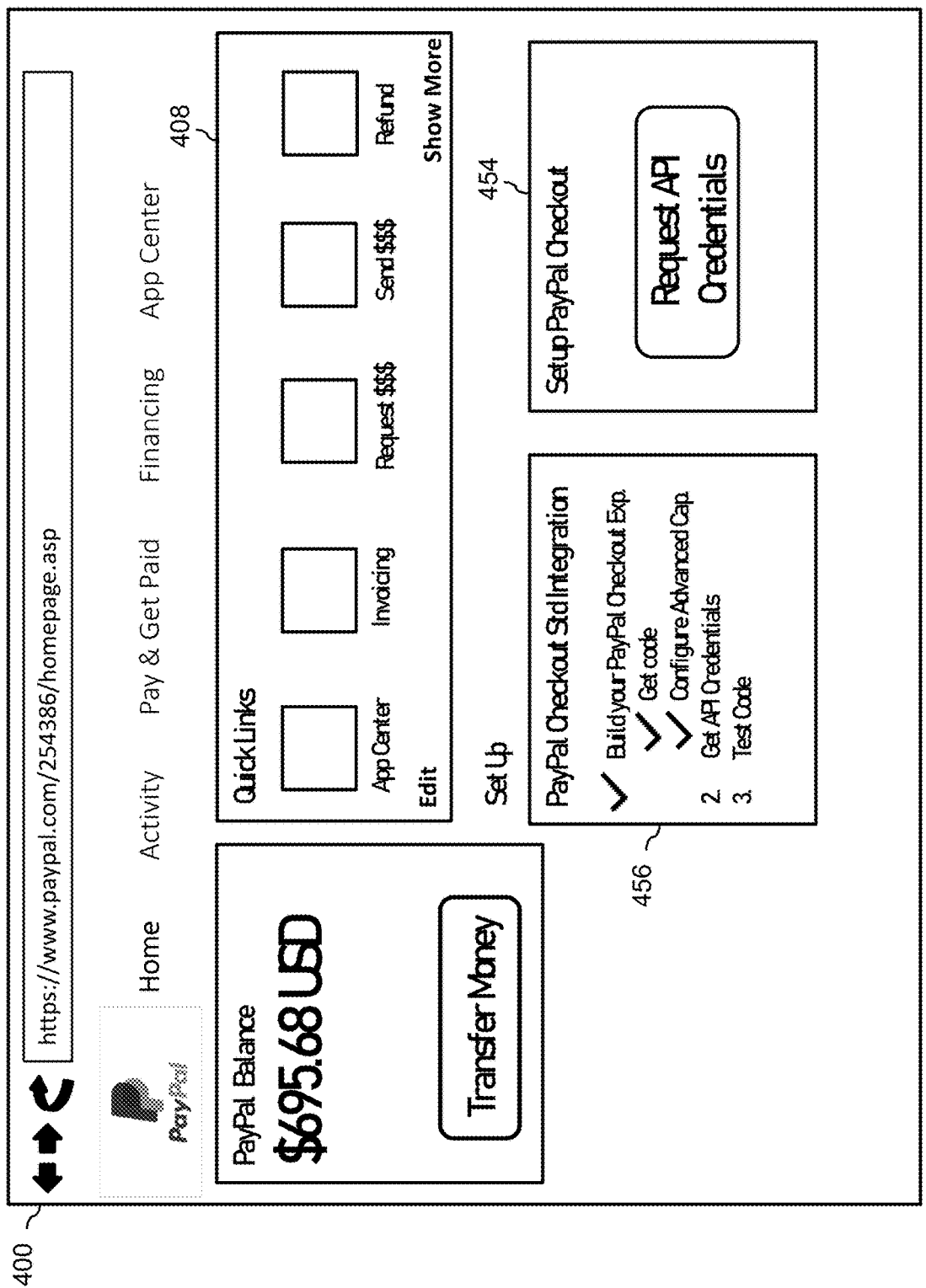
FIG. 4F illustrates a user interface page that includes a setup card fragment module that is integrated with a corresponding setup fragment module according to an embodiment of the present disclosure.

In some embodiments, in response to detecting the start setup event from the online checkout setup fragment module 454, the event handling module 208 may execute and render an online checkout setup card fragment module for tracking and presenting a progress of the setup process associated with integrating the online checkout services into the merchant website for the user. As shown in FIG. 4F, the user interface module 204 has modified the user interface 400 by adding an online checkout setup card fragment module 456. In this example, the user interface module 24 has rendered the online checkout setup card fragment module 456 next to the online checkout setup fragment module 454. In some embodiments, the online checkout setup card fragment module 456 is configured to access the status data stored in the account database 136 (e.g., the status data being inserted and/or updated by the online checkout setup fragment module 454). Based on the status data and information associated with the necessary steps required to complete the setup process, the online checkout setup card fragment module 456 may present data indicating a progress of the setup, as shown in FIG. 4F. For example, the online checkout setup card fragment module 456 may present all of the steps (and sub-steps) required for setting up the online checkout service. The online checkout setup card fragment module 456 may also indicate (e.g., by a check icon, etc.) which step(s) have been completed. When it is determined that the next step required for the setup process requires performance by the user, the online checkout setup card fragment module 456 also highlight the next step (e.g., by presenting the next step differently from the other steps).

In some embodiments, the online checkout setup card fragment module 456 may also enable the user to interact with the online checkout setup card fragment module 456. The interaction with the online checkout setup card fragment module 456 may trigger one or more events. For example, when the user selects a step (or a sub-step) that requires an action by the user, the online checkout setup card fragment module 456 may broadcast an event (e.g., a step selection event). In response to detecting the step selection event, the event handling module 208 may determine whether the online checkout setup fragment module 454 is being rendered on the user interface 400, and may execute and render the online checkout setup fragment module 454 if the online checkout setup fragment module 454 is not already rendered. The event handling module 208 may also transmit the step selection event as an input parameter to the online checkout setup fragment module 454. Based on the step selection event, the online checkout setup fragment module 454 may provide instructions for the user the complete the corresponding step, as shown in FIG. 4F. Thus, the integration module 132 may enable the online checkout setup card fragment module 456 and the online checkout setup fragment module 454 to provide an integrated user interface for the user without requiring the fragment modules to communicate with each other.

Similar to other fragment modules, since the setup card fragment modules are standalone applications that do not depend on any other modules, the setup fragment modules and the setup card fragment modules can be included (e.g., executed and render, etc.) in any of the user interface pages of the online service provider, regardless of which other modules are also included (or excluded) in the user interface pages. For example, when the user is accessing any user interface page (e.g., a homepage, an app center page, etc.), the integration module 132 may determine if the user is in the process of setting up any services. If it is determined that the user is in the process of setting up a service, the integration module 132 may include a setup card fragment module corresponding to the service in the user interface page, such that the setup card fragment module may present a progress of the setup process for the service on the user interface page.

In some embodiments, the fragment configuration module 206 may provide an account identifier associated with the user account to the setup card fragment module as an input value when the user interface module 204 executes and/or renders the setup card fragment module. Based on the account identifier, when the setup card is being executed and rendered on the user interface, the setup card fragment module may retrieve information (e.g., the status of the setup process) associated with the setup process of the service and present a progress of the setup process based on the retrieved information. This way, the user can view the progress of all the setup processes that have been indicated and not completed easily on the user interface page the user is viewing.

In some embodiments, a setup card fragment module (e.g., the online checkout setup card fragment module 456) may also display an alert when the setup process is awaiting an action from the user (e.g., submission of documents, confirmation, etc.) to remind the user to perform the action in order to move forward the setup process. In some embodiments, a selection of the alert (e.g., by the user) may trigger an alert selection event for the setup card fragment module. Based on the alert selection event, the setup card fragment may change from presenting of the progress of the setup process to presenting a description of the steps/actions required for the user to take. The setup card fragment module may also broadcast the alert selection event, such that the integration module 132 may cause a corresponding setup fragment module to be rendered on the user interface.

This enables the user to perform/complete the step without redirecting the user away from the user interface currently viewed by the user.

The examples described above, including the quick link fragment modules, the quick action fragment modules, and the setup card fragment modules, illustrate the integrations of fragment modules within a single user interface page (e.g., simultaneously presenting the different fragment modules). According to another aspect of the disclosure, instead of or in additional to integrating different fragment modules into a single user interface page, multiple fragment modules can be integrated in a sequential manner for facilitating a workflow associated with performing a service of the online service provider. In some embodiments, each of the fragment modules may be associated with performing a part of the service. For example, the service provider server 130 may provide an onboarding service to potential users, for registering new users with the service provider server 130. The process for performing the onboarding service may involve several sub-processes, including, for example, a sub-process to select a country of origin (or a language), a sub-process to present and receive acceptance for one or more terms of services, a sub-process to receive information associated with the user (e.g., a name, an address, funding account data, etc.), and possibly other sub-processes.

Figure 5:
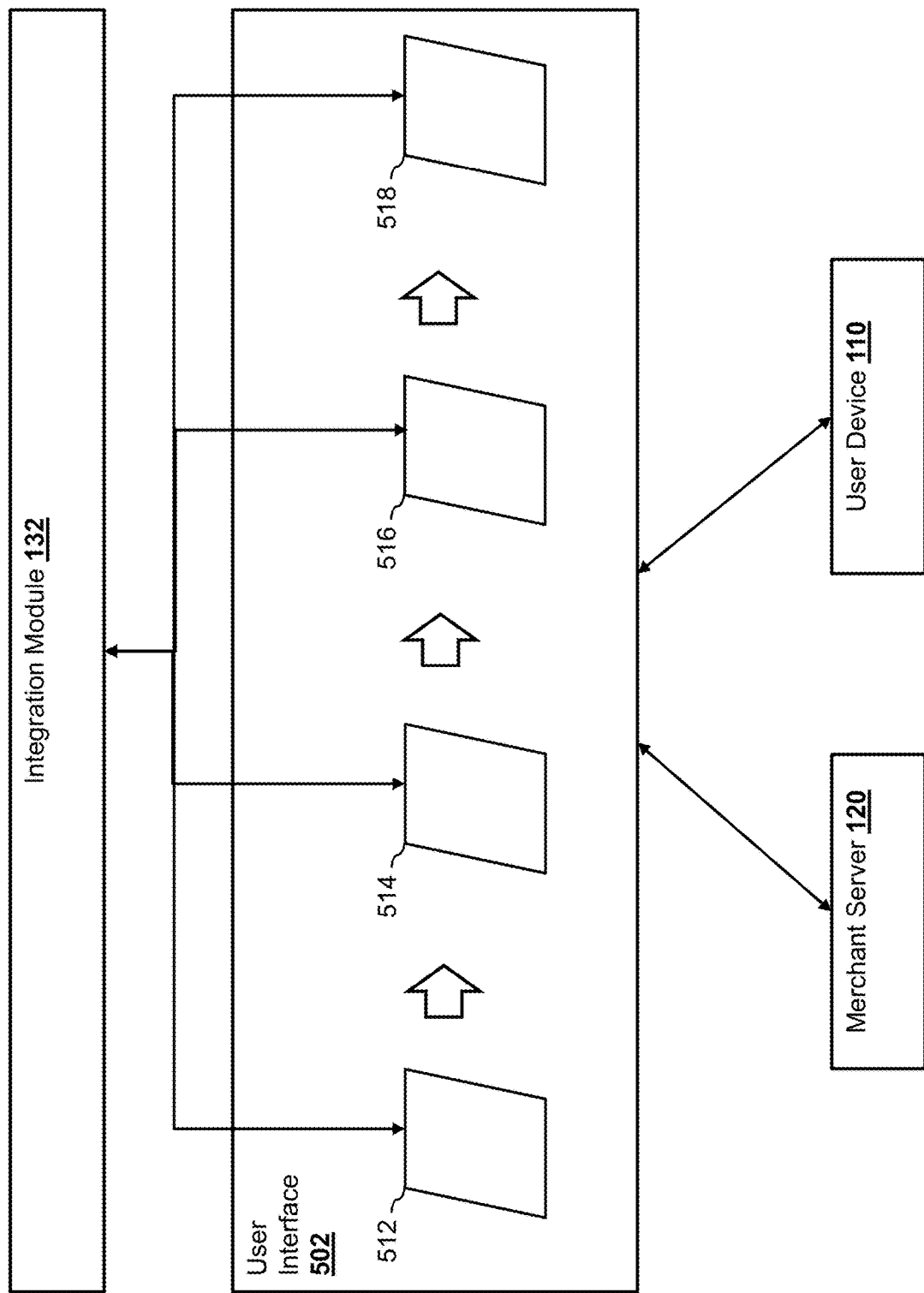
FIG. 5 illustrates sequentially integrating multiple fragment modules across multiple user interface pages according to an embodiment of the present disclosure.

Since the processes of many services offered by the online service provider require one or more of the same sub-processes, having different fragment modules for performing different sub-processes enables the online service provider to re-use these fragment modules in different processes, which increase the efficiency of developing and managing the software modules associated with the user interface of the online service provider. FIG. 5 illustrates the integration of different fragment modules sequentially into an integrated user interface 502 for facilitating a performance of a service according to a workflow. A workflow is associated with a transaction process defined by the online service provider. For example, an onboarding transaction may involve a workflow that includes multiple steps, such as a language selection step, a terms acceptance step, an information collection step, etc. In this example, upon receiving a request to initiate an onboarding service for a user, the fragment selection module 210 may determine various fragment modules to be integrated sequentially into the user interface 502 for facilitating the onboarding service, which may include a country selector fragment module 512 for performing the sub-process of selecting a country of origin (or a language), a TOS fragment module 514 for performing the sub-process of presenting and receiving acceptance of various terms of services, an address collector fragment module 516 for performing the sub-process of obtaining an address from a user, and other fragment modules 518 for performing other sub-processes for the onboarding service.

The integration manager 202 may then sequentially execute the fragment modules 512-518 according to the sequence of sub-processes associated with performing the onboarding service. By sequentially executing the fragment modules 512-518, the user interface module 204 presents, on a display of a user device, a user interface 502 that sequentially renders the fragment modules 512-518 in sequence (e.g., one after another) to perform the onboarding service.

Figure 6A:
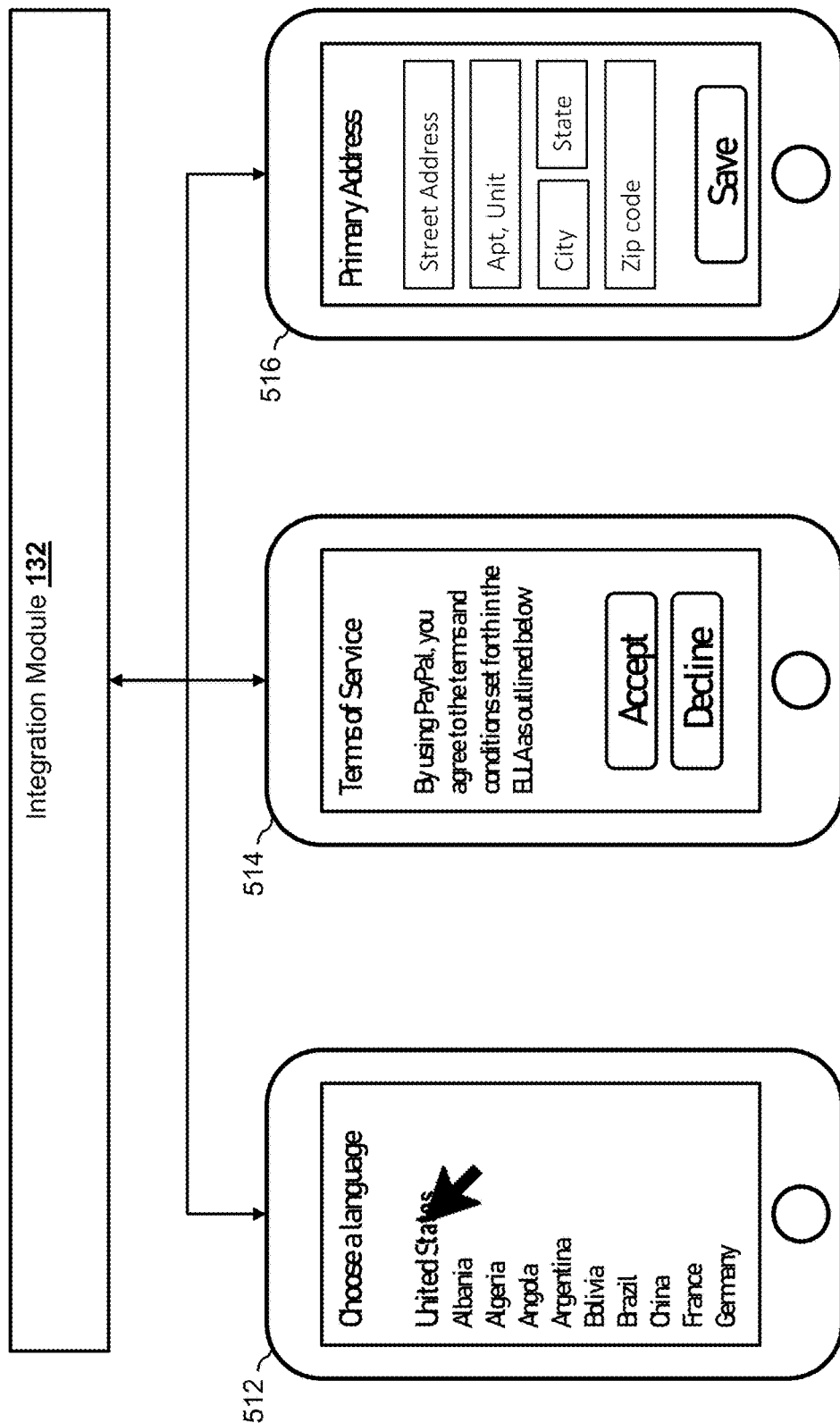
FIG. 6A illustrates facilitating event handling across multiple fragment modules that are sequentially integrated according to an embodiment of the present disclosure.
Figure 6B:
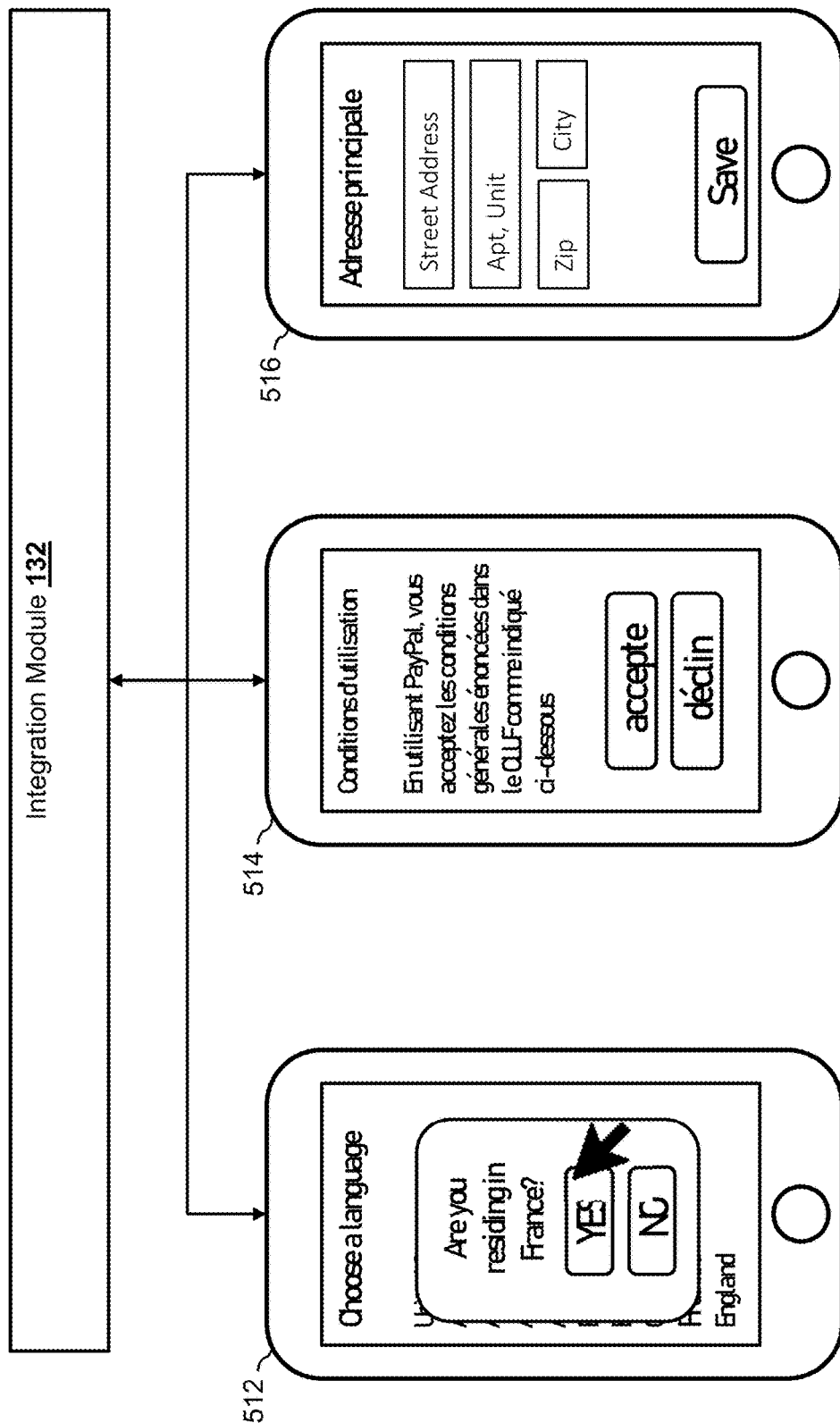
FIG. 6B illustrates different workflows performed by fragment modules based on different events according to an embodiment of the present disclosure.

FIGS. 6A and 6B illustrate execution of a series of fragment modules according to an onboarding workflow. As shown in FIG. 6A, the user interface module 204 may first execute and/or render the country selector fragment module 512. The country selector fragment module 512 may present a list of countries to be selected by the user (e.g., the user 140). Selecting a country on the selector fragment module 512 may trigger an event (e.g., a country selection event).

In some embodiments, during the execution of the sequence of fragment modules 512-518, the integration module 132 (e.g., specifically the event handling module 208) may monitor events that occur in the fragment modules 512-518, and may perform one or more actions based on detecting the events. The actions may include modifying a state and/or an input parameter for one or more other fragment modules (which may cause the other fragment modules to perform different workflows), suspending and/or aborting the execution of a fragment module, resuming the execution of a fragment module with state information, aborting the performance of the service, or other actions.

For example, while executing the country selector fragment module 512, the selection of a country (e.g., United States) may trigger a country selection event. In response to detecting the country selection event, the event handling module 208 and/or the fragment configuration module 206 may determine an input parameter for fragment modules that are subsequently executed (e.g., the fragment modules 514-518), indicating the selected country, such that the subsequently executed fragment modules 514-518 may perform workflows based on the selected country (e.g., presenting content in a language and/or in a format according to the selected country). Thus, the event handling module 208 and/or the fragment configuration module 206 may provide an input parameter indicating the selected country to the TOS fragment module 514 when executing the TOS fragment module 514, such that the TOS fragment module 514 may be configured to select a particular workflow from different workflows associated with different countries, and perform the particular workflow via the user interface 502. For example, different terms may be applicable for different countries (e.g., based on local laws and regulations, etc.). The TOS fragment module 514 may include different workflows for presenting different terms associated with different countries. Based on the input parameter, the TOS fragment module may select a particular workflow associated with the United States, and may perform the particular workflow via the user interface 502.

As shown in FIG. 6A, the TOS fragment module presents the terms of services associated with the selected country (e.g., in United States English, using terms applicable for the United States, etc.), based on the input parameter. The event handling module 208 and/or the fragment configuration module 206 may also provide an input parameter indicating the selected country to the address collector fragment 516 module 516 when executing the address collector fragment module 516, such that the address collector fragment module 516 may be configured to perform a workflow associated with the selected country (e.g., presenting an address input form in a format associated with the selected country, as shown in FIG. 6A.

In another example, assuming that based on the selected country as United States, the address collector fragment module 516 has presented the address input form in a United States address format on the user interface 502 of the online service provider, as shown in FIG. 6A. The address collector fragment module 516 may detect that the address entered into the address input form by the user corresponds to an address format different from a United States address format (e.g., a Canada address format). The address collector fragment module 516 may trigger a wrong address format event based on the address input by the user. In some embodiments, the address collector fragment module 516 may automatically change the presentation to an address input form corresponding to a French address based on the wrong address format event.

In some embodiments, upon detecting the wrong address format event, the event handling module 208 may also perform one or more actions. For example, the event handling module 208 may determine that the country of origin was selected by mistake. Thus, the integration manager 202 may suspend the address collector fragment module 516. In some embodiments, the integration manager 202 may retrieve a state of the address collector fragment module 516 before suspending or terminating the address collector fragment module 516, so that the user interface module 204 may provide the state to the address collector fragment module 516 when the user interface module 204 subsequently resumes execution of the address collector fragment module 516.

The user interface module 204 may then execute the country selector fragment module 512 again, with an additional input indicating that the country of origin may be France instead of United States. As shown in FIG. 6B, based on the input, the country selector fragment module 512 may prompt the user to verify the country of origin (which is a different workflow from the one illustrated in FIG. 6A), preferably asking the user to confirm that the country is France. Based on the selection of the user from the country selector fragment module 512, the integration module 132 of some embodiments may execute (or re-execute) other fragment modules (e.g., the TOS fragment module 514, the address collector fragment module 516, etc.) in the sequence based on the newly selected country. As shown in FIG. 6B, based on the selection of France, the TOS fragment module 514 may perform a particular workflow associated with France (e.g., by presenting terms associated with France). The address collector fragment module 516 may also perform a particular workflow associated with France (e.g., by presenting data input fields corresponding to a French address format, etc.).

In some embodiments, a fragment module can execute one or more other fragment modules (e.g., nested fragment modules). In other words, one fragment module may execute multiple fragment modules within the fragment module. In these scenarios, the fragment module that executes one or more other fragment modules may take the role as the orchestrator for controlling and rendering the one or more other fragment modules executed therein. For example, the terms of services may be different for different services, even though the terms for each service may be a compilation of various standard term template, that may be used for other services. As such, multiple term fragment modules may be developed and configured to present and confirm acceptance of the various standard term template. When the user interface module 204 executes the TOS fragment module 514, the user interface module 204 may provide, as an input parameter, the service that is being performed by the collective fragment modules 512-518. Based on the input parameter which indicates the service, the TOS fragment module 514 may select and retrieve a set of term fragment modules for the service. The TOS fragment module 514 may also execute the term fragment modules sequentially and/or simultaneously to obtain confirmation of acceptance from the user for each of the corresponding terms.

Similar to other fragment modules, each of the term fragment modules may broadcast events based on interaction with the user or other factors. For example, whenever the user accepts a term (e.g., select the accept button), the term fragment module may broadcast an accept event, which may be detected by the TOS fragment module 514 acting as an orchestrator. In response to detecting the accept event, the TOS fragment module 514 may execute the next term fragment module in the sequence, and if all of the term fragment modules have been executed, the TOS fragment module 514 may trigger a completion event, which may be detected by the event handling module 208 of the integration module 132.

On the other hand, if the user declines a term (e.g., select the decline button), the term fragment module may broadcast a decline event, which may be detected by the TOS fragment module 514. The TOS fragment module 514 may perform one or more actions in response to detecting the decline event. For example, the TOS fragment module 514 may trigger an error event and broadcast the error event, which may be detected by the event handling module 208 of the integration module 132. The TOS fragment module 514 may prompt the user, via the user interface, for a confirmation that the user is declining that term, and may provide a warning that declining the term will abort the performance of the service. When the event handling module 208 detects the error event from the TOS fragment module 514, the event handling module 208 may abort the performance of the service, may present an alert to the user indicating that the service cannot be performed, or any other action.

The integration of fragment modules can be done in different ways and/or combinations. For example, in some embodiments, a fragment module that is simultaneously integrated within a user interface page among other fragment modules may become an orchestrator, and facilitate a sequential integration of fragment modules within the fragment module as well. The examples above illustrate different methods of integrating various fragment modules into a coherent and integrated interface, whether by simultaneously rendering multiple fragment modules, sequentially rendering multiple fragment modules, nesting fragment modules within other fragment modules, or combinations thereof. The integration module 132 acts as an orchestrator for facilitating event handling for events associated with different fragment modules being rendered and performing actions to cause changes to one or more other fragment modules in response to the events. When fragment modules are rendered within another fragment module (e.g., nested fragment module), the fragment module that renders the other fragment modules would take the role as the orchestrator by facilitating event handling for events associated with the other fragment modules. The dynamic and flexibility nature of this framework enables fragment modules, that are standalone applications that are independent from other fragment modules, to be seamlessly integrated within a user interface or an application.

Figure 7:
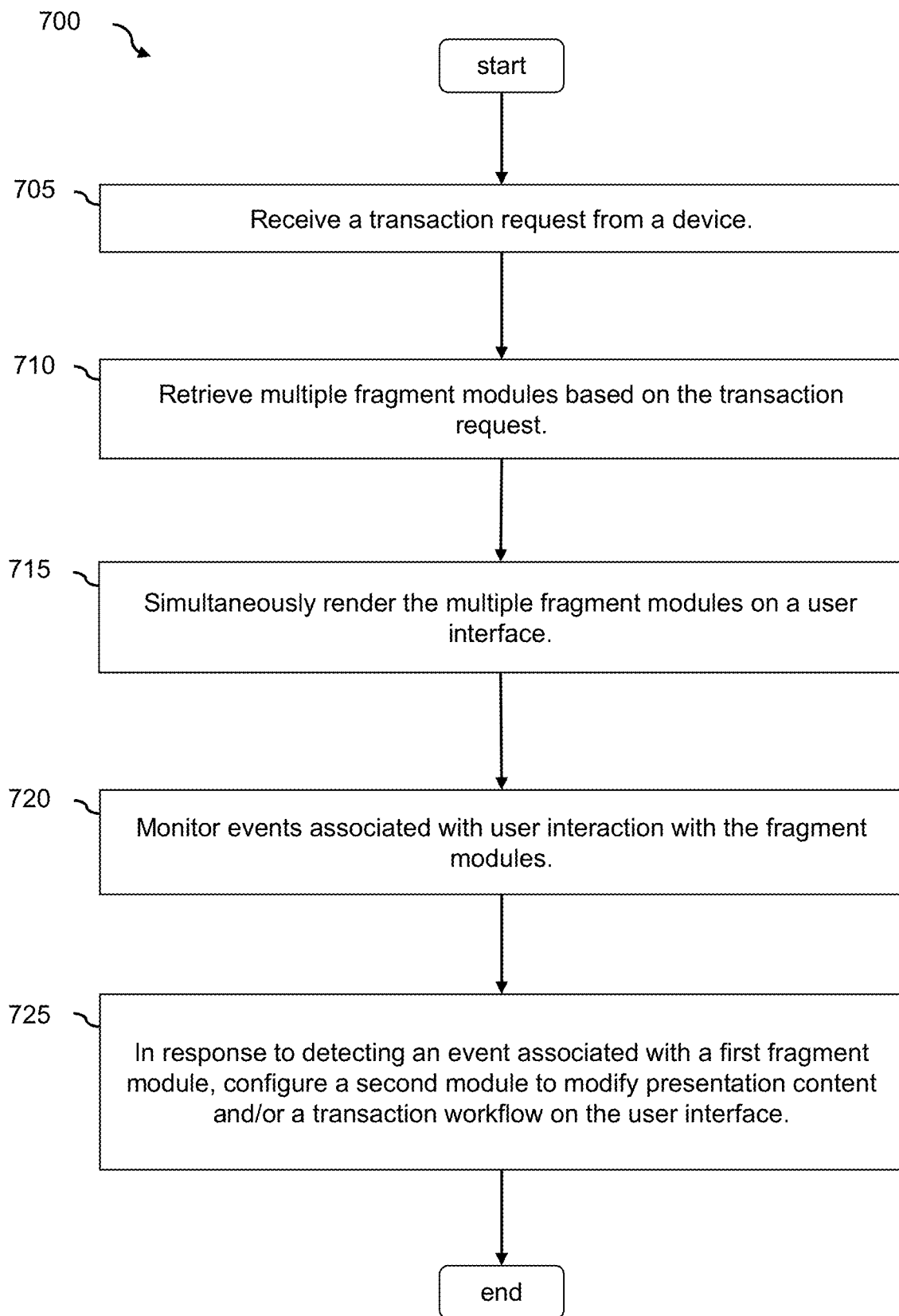
FIG. 7 is a flowchart showing a process of simultaneously integrating fragment modules within a user interface page according to an embodiment of the present disclosure.

FIG. 7 illustrates a process 700 for simultaneously integrating fragment modules into an integrated user interface page according to various embodiments of the disclosure. In some embodiments, at least a portion of the process 700 may be performed by the integration module 132 and the interface server 134 of the service provider server 130. The process 700 begins by receiving (at step 705) a transaction request from a device. For example, the interface server 134 may receive a transaction request from the user device 110 or the merchant server 120. The transaction request may be received in the form of an HTTP request from a browser application of the device or an API call from a mobile application of the device. The interface server 134 may transmit the transaction request to the integration module 132 for generating a user interface for processing the transaction request.

Upon receiving the transaction request, the process 700 retrieves (at step 710) multiple fragment modules based on the transaction request. For example, the fragment selection module 210 may select a set of fragment modules that will be used for generating the user interface for processing the transaction request. The selected set of fragment modules may encompass only a portion, but not all, of the fragment modules available to the integration module 132. The selected fragment modules may be developed by different team of people or by different organizations. The selected fragment modules may also be stored in different devices or servers, such as in the service provider server 130 and/or the remote servers 180 and 190. Thus, the fragment selection module 208 may retrieve the selected fragment modules from one or more of the devices.

The process 700 then renders (at step 715) the multiple fragment modules simultaneously or very close in time to each other (e.g., within a few milliseconds) in a user interface. For example, the user interface module 204 may render the selected fragment modules, along with other content, on the user interface (e.g., the user interface 400). The user interface module 204 may also provide the fragment modules input parameters for specifying how the fragment modules are rendered. The input parameters may specify the look and feel of the rendered fragment modules (e.g., background color, font characteristics, title, etc.). The input parameters may also specify a state (e.g., an initial state) in which the fragment module should be rendered. In some embodiments, the user interface module 204 may render the selected fragment modules in different locations within the user interface 400 according to a layout specification of the user interface 400.

While the fragment modules are rendered on the user interface 400 (that is displayed on a user device), events may be triggered based on user interactions with the fragment modules. The fragment modules may broadcast the events. Thus, the process 700 monitors (at step 720) events associated with user interaction with the fragment modules. As the fragment modules broadcast events, the event handling module 208 may detect the events and may perform one or more actions based on the events.

In response to detecting an event associated with a first fragment module, the process 700 configures (at step 725) a second fragment module to modify presentation content and/or a transaction workflow on the user interface. For example, when the event handling module 208 detects an event (e.g., a transaction selection event) associated with a fragment module (e.g., a recent transaction fragment module), the event handling module 208 may provide to an input parameter indicating the event (e.g., the selected transaction) to another fragment module (e.g., an invoicing fragment module). In response to the input parameter, the invoicing fragment module may automatically fill-in some of the text input boxes displayed on the user interface 400 with information associated with the selected transaction or automatically generating and presenting an invoice associated with the transaction.

Figure 8:
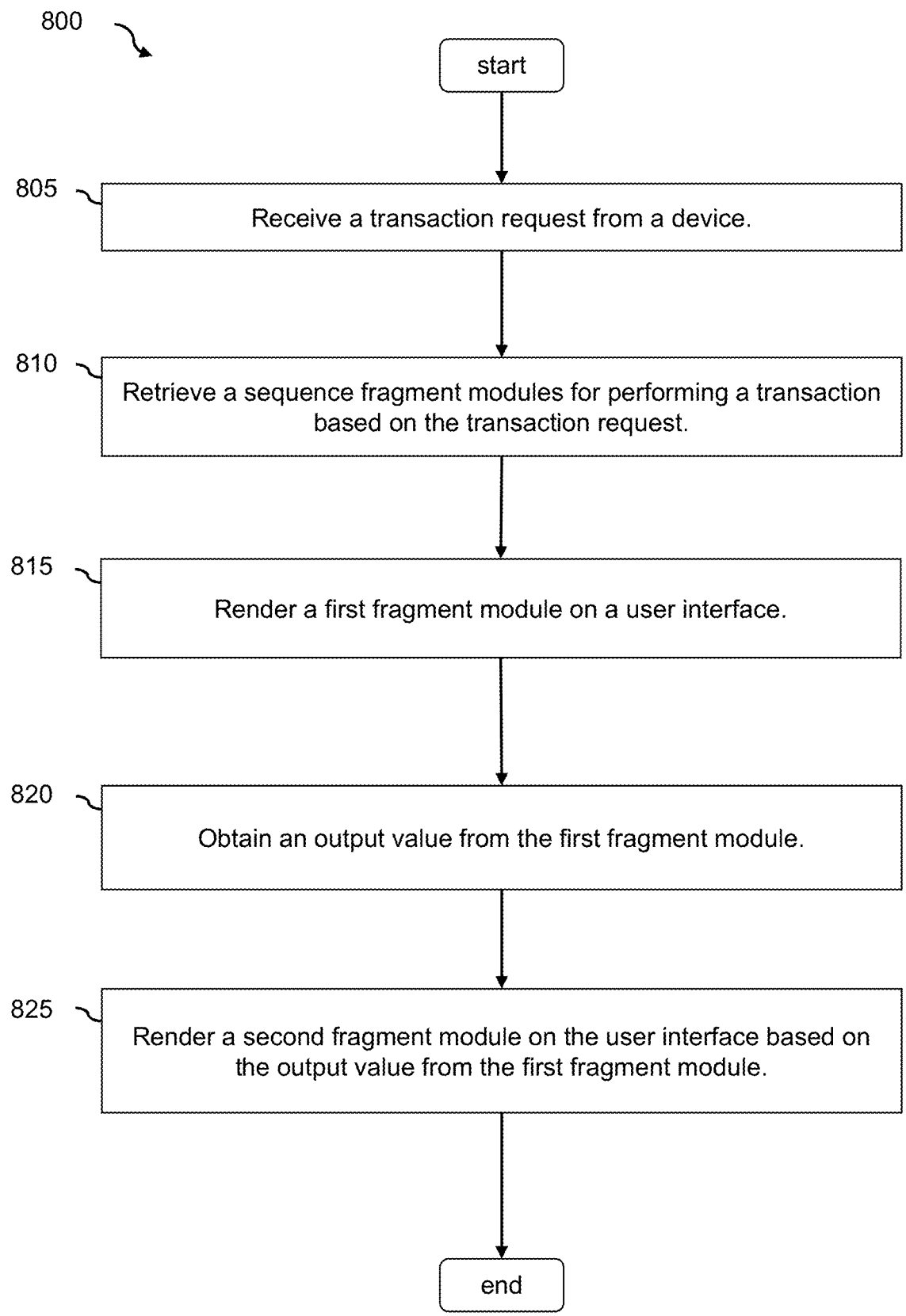
FIG. 8 is a flowchart showing a process of sequentially integrating fragment modules across multiple user interface pages according to an embodiment of the present disclosure.

FIG. 8 illustrates a process 800 for sequentially integrating fragment modules into a flow of integrated user interface pages according to various embodiments of the disclosure. In some embodiments, at least a portion of the process 800 may be performed by the integration module 132 and the interface server 134 of the service provider server 130. The process 800 begins by receiving (at step 805) a transaction request from a device. For example, the interface server 134 may receive a transaction request from the user device 110 or the merchant server 120. The transaction request may be received in the form of an HTTP request from a browser application of the device or an API call from a mobile application of the device. The interface server 134 may transmit the transaction request to the integration module 132 for generating a user interface for processing the transaction request.

Upon receiving the transaction request, the process 800 retrieves (at step 810) a sequence of fragment modules based on the transaction request. For example, the fragment selection module 210 may select a set of fragment modules that will be used for generating the user interface for processing the transaction request. The selected set of fragment modules may encompass only a portion, but not all, of the fragment modules available to the integration module 132. The selected fragment modules may be developed by different team of people or by different organizations. The selected fragment modules may also be stored in different devices or servers, such as in the service provider server 130 and/or the remote servers 180 and 190. Thus, the fragment selection module 208 may retrieve the selected fragment modules from one or more of the devices.

The process 800 then renders (at step 815) a first fragment module on a user interface. For example, the user interface module 204 may render a first fragment module in the sequence of fragment modules. For performing an onboarding service which includes a country selector fragment module, a TOS fragment module, an address collector fragment module, and other fragment modules, the user interface module 204 may first render the country selector fragment module on the user interface 502.

The process 800 obtains (at step 820) an output value from the first fragment module. The output value may be generated by the first fragment module as the first fragment module has completed a sub-workflow. The output value may also be included in an event broadcasted by the first fragment module (e.g., a country selection event). In this example, the output value may indicate a country selected by a user.

The process 800 then renders (at step 825) a second fragment module on the user interface based on the output value from the first fragment module. For example, the user interface module 204 may renders a second fragment module in the sequence of fragment modules (e.g., the TOS fragment module), and may provide input parameters representing the output value to the second fragment module. Based on the input parameters representing a selected country, the TOS fragment module may present content in a language and/or format according to the selected country.

Figure 9:
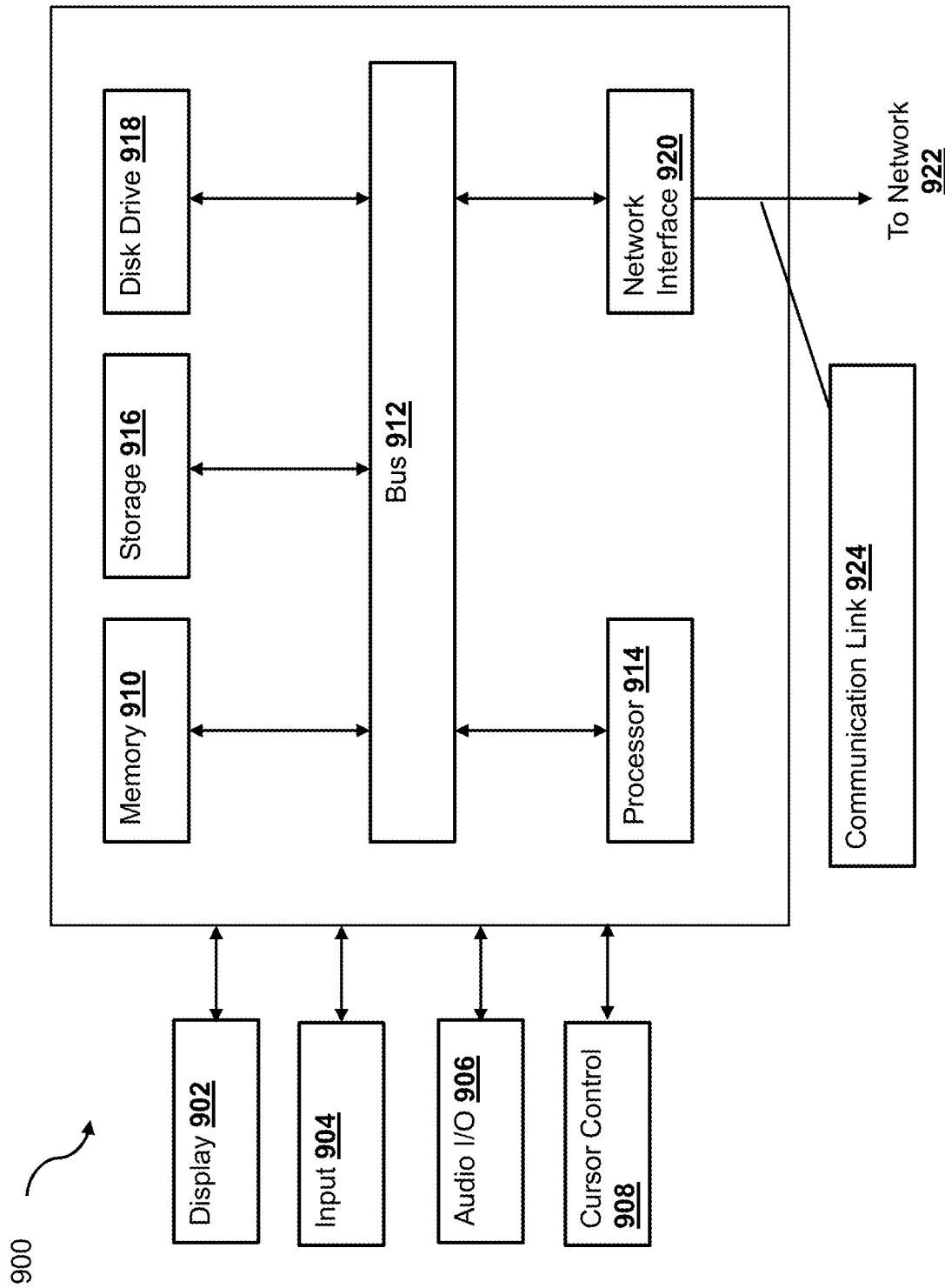
FIG. 9 is a block diagram of a system for implementing a device according to an embodiment of the present disclosure.

FIG. 9 is a block diagram of a computer system 900 suitable for implementing one or more embodiments of the present disclosure, including the service provider server 130, the merchant server 120, remote servers 180 and 190, and the user device 110. In various implementations, the user device 110 may include a mobile cellular phone, personal computer (PC), laptop, wearable computing device, etc. adapted for wireless communication, and each of the service provider server 130, the merchant server 120, and the remote servers 180 and 190 may include a network computing device, such as a server. Thus, it should be appreciated that the devices 110, 120, 130, 180, and 190 may be implemented as the computer system 600 in a manner as follows.

The computer system 900 includes a bus 912 or other communication mechanism for communicating information data, signals, and information between various components of the computer system 900. The components include an input/output (I/O) component 904 that processes a user (i.e., sender, recipient, service provider) action, such as selecting keys from a keypad/keyboard, selecting one or more buttons or links, etc., and sends a corresponding signal to the bus 912. The I/O component 904 may also include an output component, such as a display 902 and a cursor control 908 (such as a keyboard, keypad, mouse, etc.). The display 902 may be configured to present a login page for logging into a user account or a checkout page for purchasing an item from a merchant. An optional audio input/output component 906 may also be included to allow a user to use voice for inputting information by converting audio signals. The audio I/O component 906 may allow the user to hear audio. A transceiver or network interface 820 transmits and receives signals between the computer system 900 and other devices, such as another user device, a merchant server, or a service provider server via a network 922, such as network 160 of FIG. 1. In one embodiment, the transmission is wireless, although other transmission mediums and methods may also be suitable. A processor 914, which can be a micro-controller, digital signal processor (DSP), or other processing component, processes these various signals, such as for display on the computer system 900 or transmission to other devices via a communication link 924. The processor 914 may also control transmission of information, such as cookies or IP addresses, to other devices.

The components of the computer system 900 also include a system memory component 910 (e.g., RAM), a static storage component 916 (e.g., ROM), and/or a disk drive 918 (e.g., a solid-state drive, a hard drive). The computer system 900 performs specific operations by the processor 914 and other components by executing one or more sequences of instructions contained in the system memory component 910. For example, the processor 914 can perform the fragment modules integration functionalities described herein according to the processes 700 and 800.

Logic may be encoded in a computer readable medium, which may refer to any medium that participates in providing instructions to the processor 914 for execution. Such a medium may take many forms, including but not limited to, non-volatile media, volatile media, and transmission media. In various implementations, non-volatile media includes optical or magnetic disks, volatile media includes dynamic memory, such as the system memory component 910, and transmission media includes coaxial cables, copper wire, and fiber optics, including wires that comprise the bus 912. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of computer systems 900 coupled by the communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
in response to receiving a request from a user device, retrieving a plurality of fragment modules associated with a user interface based on the request, wherein each fragment module in the plurality of fragment modules is a standalone application that is independent from other fragment modules in the plurality of fragment modules;
generating the user interface based on rendering the plurality of fragment modules, wherein each fragment module in the plurality of fragment modules, when rendered, is configured to present a corresponding interface within a corresponding portion of the user interface and to interact with a user of the user device via the corresponding interface;
presenting the user interface on the user device; and
while the user interface is presented on the user device:
receiving, from a first fragment module in the plurality of fragment modules, an indication of an event associated with an interaction between the user and a first interface corresponding to the first fragment module, wherein the first fragment module is configured to perform a first functionality for the user based on the event; and in response to receiving the indication, broadcasting the event to the plurality of fragment modules, wherein a second fragment module in the plurality of fragment modules, upon detecting the broadcasted event, is configured to perform, for the user, a second functionality related to the first functionality based on the event.

2. The system of claim 1, wherein the first fragment module is further configured to process a first electronic transaction for the user via the first interface, and wherein the event indicates a completion of the first electronic transaction.

3. The system of claim 2, wherein the second fragment module is further configured to perform a second electronic transaction based on the completion of the first electronic transaction.

4. The system of claim 1, wherein the event indicates an initiation of a process flow by the first fragment module based on the first fragment module interacting with the user, and wherein the second fragment module is further configured to track a progress associated with the process flow and present, on the second interface, the progress.

5. The system of claim 1, wherein the second fragment module is configured to perform the second functionality for the user based on a browsing history of the user.

6. The system of claim 1, wherein the user interface is a webpage.

7. The system of claim 1, wherein the user interface is a first user interface, and wherein the operations further comprise:

subsequent to presenting the first user interface on the user device and in response to receiving a second request for a second user interface from the user device, retrieving a second plurality of fragment modules associated with the second user interface for the second request, wherein the second plurality of fragment modules comprises the second fragment module; and generating the second user interface based on rendering the second plurality of fragment modules, wherein the second fragment module is further configured to render a presentation based on a performance of the second functionality within a corresponding portion of the second user interface.

8. A method comprising:

simultaneously rendering, by one or more hardware processors, a plurality of fragment modules on a user interface displayed on a user device, wherein each fragment module in the plurality of fragment modules is a standalone application that is independent from other fragment modules in the plurality of fragment modules, and wherein each fragment module in the plurality of fragment modules, when rendered, is configured to present a corresponding interface within a corresponding portion of the user interface and to interact with a user of the user device via the corresponding interface;

receiving, by the one or more hardware processors and from a first fragment module in the plurality of fragment modules, an indication of an event associated with an interaction between the user and a first interface corresponding to the first fragment module, wherein the first fragment module is configured to perform a first functionality for the user based on the event; and in response to receiving the indication, broadcasting, by the one or more hardware processors, the event to the plurality of fragment modules, wherein a second fragment module in the plurality of fragment modules, upon detecting the broadcasted event, is configured to perform, for the user, a second functionality related to the first functionality based on the event.

9. The method of claim 8, wherein the first fragment module is further configured to process a first electronic transaction for the user via the first interface.

10. The method of claim 9, wherein the event indicates a completion of the first electronic transaction, and wherein the second fragment module is further configured to perform a second electronic transaction based on the completion of the first electronic transaction.

11. The method of claim 8, wherein the event is associated with the user hovering over a set of data displayed on the first interface, and wherein the second fragment module is further configured to present, on a second interface corresponding to the second fragment module, an interactive object for processing an electronic transaction based on the set of data in response to the event.

12. The method of claim 11, wherein the second fragment module is further configured to present, on the second interface, an outcome of the processing the first electronic transaction on the second interface.

13. The method of claim 8, wherein the user interface comprises a mobile application page.

14. A non-transitory machine-readable medium having stored thereon machine-readable instructions executable to cause a machine to perform operations comprising:

retrieving a plurality of fragment modules associated with a webpage, wherein each fragment module in the plurality of fragment modules is a standalone application that is independent from other fragment modules in the plurality of fragment modules;

generating the webpage based on rendering the plurality of fragment modules, wherein each fragment module in the plurality of fragment modules, when rendered, is configured to present a corresponding interface within a corresponding portion of the webpage and to interact with a user of a user device via the corresponding interface;

causing the webpage to be presented on the user device; and while the webpage is presented on the user device:

receiving, from a first fragment module in the plurality of fragment modules, an indication of an event associated with an interaction between a user and a first interface corresponding to the first fragment module, wherein the first fragment module is configured to perform a first functionality for the user based on the event; and in response to receiving the indication, broadcasting the event to the plurality of fragment modules, wherein a second fragment module in the plurality of fragment modules, upon detecting the broadcasted event, is configured to perform, for the user, a second functionality related to the first functionality based on the event.

15. The non-transitory machine-readable medium of claim 14, wherein the plurality of fragment modules is retrieved from a plurality of remote devices.

16. The non-transitory machine-readable medium of claim 14, wherein the second fragment module is further configured to track a progress of an electronic transaction performed by the first fragment module.

17. The non-transitory machine-readable medium of claim 14, wherein the event is associated with a completion of a first step within a transaction workflow, wherein the second fragment module is further configured to present, on the second interface, an indication of the completion of the first step within the transaction workflow without communicating with the first fragment module.

18. The non-transitory machine-readable medium of claim 14, wherein
- the event is an initiation of a setup process of a service, and wherein the operations further comprise:
- determining whether a setup card fragment module corresponding to the service is already rendered on the webpage;
- rendering the setup card fragment module on the webpage in response to determining that the setup card fragment module is not already rendered; and
- configuring the setup card fragment module to present, on the webpage, a progress of the setup process.

19. The non-transitory machine-readable medium of claim 14, wherein the second fragment module is further configured to modify a second interface corresponding to the second fragment module without redirecting the user away from the webpage.

20. The non-transitory machine-readable medium of claim 19, wherein the second fragment module is further configured to modify the second interface based on a browsing history of the user.

\* \* \* \* \*